United States Patent
Wang et al.

(10) Patent No.: US 12,105,314 B2
(45) Date of Patent: Oct. 1, 2024

(54) BACKLIGHT MODULE AND DISPLAY DEVICE

(71) Applicant: Xiamen Tianma Micro-Electronics Co., Ltd., Xiamen (CN)

(72) Inventors: Pan Wang, Xiamen (CN); Poping Shen, Xiamen (CN); Ankai Ling, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 18/123,545

(22) Filed: Mar. 20, 2023

(65) Prior Publication Data
US 2024/0176060 A1    May 30, 2024

(30) Foreign Application Priority Data
Nov. 30, 2022   (CN) .......................... 202211525175.5

(51) Int. Cl.
*F21V 8/00* (2006.01)
(52) U.S. Cl.
CPC ..................... *G02B 6/005* (2013.01)
(58) Field of Classification Search
CPC ..................................... G02B 6/005
See application file for complete search history.

(56) References Cited

U.S. PATENT DOCUMENTS

| 2018/0364412 A1* | 12/2018 | Yao ........................ G02B 6/005 |
| 2018/0373053 A1* | 12/2018 | Huang .................... G02B 6/003 |
| 2019/0179074 A1* | 6/2019 | Choi ....................... G02B 6/005 |
| 2019/0285790 A1* | 9/2019 | Usukura ................ G02B 27/02 |
| 2019/0391317 A1* | 12/2019 | An ........................ G02B 6/0065 |

FOREIGN PATENT DOCUMENTS

| CN | 111007680 A | 4/2020 |
| CN | 211123564 U | 7/2020 |
| KR | 20060020226 A | 3/2006 |

* cited by examiner

*Primary Examiner* — Evan P Dzierzynski
*Assistant Examiner* — Jessica M Apenteng
(74) *Attorney, Agent, or Firm* — Anova Law Group, PLLC

(57) ABSTRACT

A backlight module and a display device are provided. The backlight module includes a lighting-emitting unit; an optical film; and a light-adjusting layer located on a side of the optical film adjacent to the light-exiting surface of the backlight module. The light-adjusting layer includes light-adjusting units, a light-adjusting unit includes a first surface and a second surface, the first surface is located on a side of the second surface adjacent to the light-exiting surface and is a flat surface, the second surface at least includes a first sub-surface and a second sub-surface, along a second direction, a plane where the first sub-surface is located intersects a plane where the first surface is located, the first sub-surface and the second sub-surface are inclined to a side away from the light-exiting surface, and the first direction, the second direction and the third direction all intersect each other.

20 Claims, 18 Drawing Sheets

BACKLIGHT MODULE AND DISPLAY DEVICE

CROSS-REFERENCE TO RELATED APPLICATION

This application claims the priority of Chinese Patent Application No. 202211525175.5, filed on Nov. 30, 2022, the content of which is incorporated by reference in its entirety.

TECHNICAL FIELD

The present disclosure generally relates to the field of display technologies and, more particularly, relates to a backlight module and a display device.

BACKGROUND

Backlight module is one of the key components of a liquid crystal display (LCD) panel. Because the liquid crystal itself does not have a light-emitting characteristic, it is necessary to add a light-emitting source on the back of the LCD panel to achieve a full brightness of color display effect. The function of the backlight module is to supply sufficient brightness and evenly distributed plane light source such that the LCD panel can display images normally.

Backlight modules can be divided into side-entry type backlight modules and direct-down type backlight modules. The direct-down type backlight module uses a direct-down type backlight source. The direct-down type backlight requires a large number of illuminants to be evenly distributed on the entire surface. A relative hard diffusion board is required on the illuminants of the direct-down type backlight to fuzzy the illuminants while supporting the upper optical film. A side-entry type backlight source is usually disposed on the side of the light guide plate of the side-entry type backlight modules. The light emitted by the side-entry type backlight enters the light guide plate, and is re-diffused by the dots or reflective structures arranged on the light guide plate, and destroys the internal propagation caused by total reflection, such that the light is evenly emitted from the light-emitting surface of the light guide plate to achieve the conversion from the point light source to a surface light source. To improve the efficiency of the backlight module, whether it is a direct-down type or a side-entry type, the structures of the lower diffuser, prism and upper diffuser need to be designed above the backlight. The role of the lower diffuser is to concentrate the light emitted from the light guide plate and evenly project it onto the prism. The function of the prism is to use the law of total reflection and refraction to concentrate the dispersed light in a certain angle range and emit it, thereby improving the brightness in this angle range. The function of the upper diffuser is to fuzzy the light emitted from the prism and evenly transmit the light to be seen evenly, and at the same time, the upper diffuser can protect the prism. The deflection angle of the light by the prism is relatively large, resulting in more light at a large viewing angle and less light at a small viewing angle. Accordingly, the contrast of the small viewing angle area cannot meet the requirements.

Therefore, there is an urgent need to provide a backlight module and a display device capable of improving the contrast of small viewing angle areas. The present disclosed backlight module and display devices are direct to solve one or more problems set forth above and other problems in the arts.

SUMMARY

One aspect of the present disclosure provides a backlight module. The backlight module includes a lighting-emitting unit; an optical film, wherein light provided by the light-emitting unit propagates in a first direction after passing through the optical film, and the first direction is a direction perpendicular to a light-exiting surface of the backlight module; and a light-adjusting layer located on a side of the optical film adjacent to the light-exiting surface of the backlight module. The light-adjusting layer includes a plurality of light-adjusting units, a light-adjusting unit of the plurality of light-adjusting unit includes a first surface and a second surface oppositely arranged along the first direction, the first surface is located on a side of the second surface adjacent to the light-exiting surface of the backlight module, the second surface at least includes a first sub-surface and a second sub-surface, the first surface is a flat surface, along a second direction, a plane where the first sub-surface is located intersects a plane where the first surface is located, the first sub-surface is inclined to a side away from the light-exiting surface of the backlight module, along the third direction, a plane where the second sub-surface is located intersects the plane where the first surface is located, and the second sub-surface is inclined to a side away from the light-exiting surface of the backlight module, the first direction, the second direction and the third direction all intersect each other, and the second direction and the third direction are parallel to the light-exiting surface of the backlight module.

Another aspect of the present disclosure provides a display device. The display device includes a backlight module; and a display panel disposed on a light-exiting side of the backlight module. The backlight module includes a lighting-emitting unit; an optical film, wherein light provided by the light-emitting unit propagates in a first direction after passing through the optical film, and the first direction is a direction perpendicular to a light-exiting surface of the backlight module; and a light-adjusting layer located on a side of the optical film adjacent to the light-exiting surface of the backlight module. The light-adjusting layer includes a plurality of light-adjusting units, a light-adjusting unit of the plurality of light-adjusting unit includes a first surface and a second surface oppositely arranged along the first direction, the first surface is located on a side of the second surface adjacent to the light-exiting surface of the backlight module, the second surface at least includes a first sub-surface and a second sub-surface, the first surface is a flat surface, along a second direction, a plane where the first sub-surface is located intersects a plane where the first surface is located, the first sub-surface is inclined to a side away from the light-exiting surface of the backlight module, along the third direction, a plane where the second sub-surface is located intersects the plane where the first surface is located, and the second sub-surface is inclined to a side away from the light-exiting surface of the backlight module, the first direction, the second direction and the third direction all intersect each other, and the second direction and the third direction are parallel to the light-exiting surface of the backlight module.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

FIG. 20 illustrates an exemplary contour plot of contrast of a backlight module in

FIG. 19;

DETAILED DESCRIPTION

Various exemplary embodiments of the present disclosure will now be described in detail with reference to the accompanying drawings. It should be noted that the relative arrangements of components and steps, numerical expressions and numerical values set forth in these embodiments do not limit the scope of the present disclosure unless specifically stated otherwise.

The following description of at least one exemplary embodiment is merely illustrative in nature and in no way taken as limiting the disclosure, its application or uses.

Techniques, methods and devices known to those of ordinary skill in the relevant art may not be discussed in detail, but where appropriate, such techniques, methods and devices should be considered parts of the description.

In all examples shown and discussed herein, any specific values should be construed as exemplary only, and not as limitations. Therefore, other instances of the exemplary embodiment may have different values.

It should be noted that like numerals and letters denote like items in the following figures. Therefore, once an item is defined in one figure, it does not require further discussion in subsequent figures.

Figure 1:
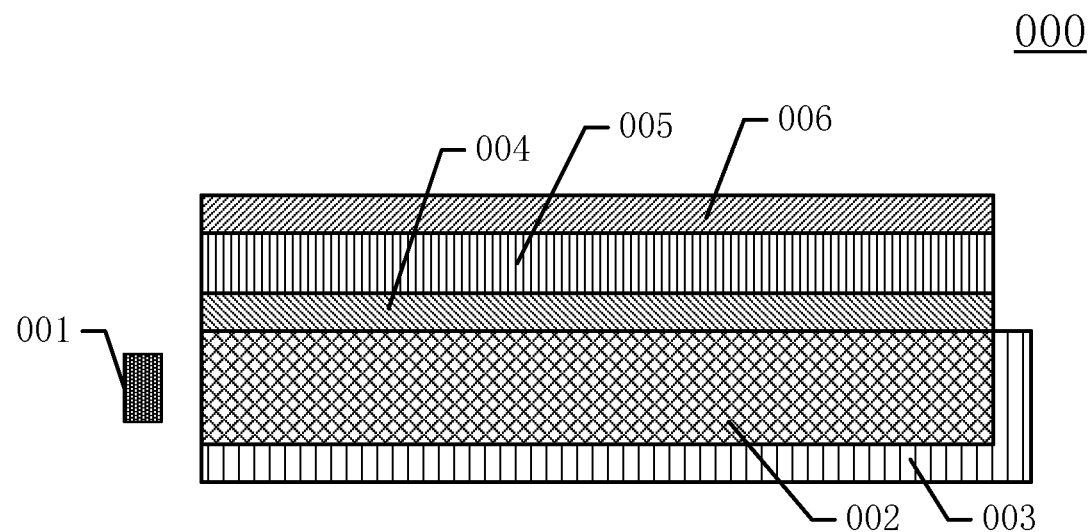
FIG. 1 illustrates a backlight module.
Figure 2:
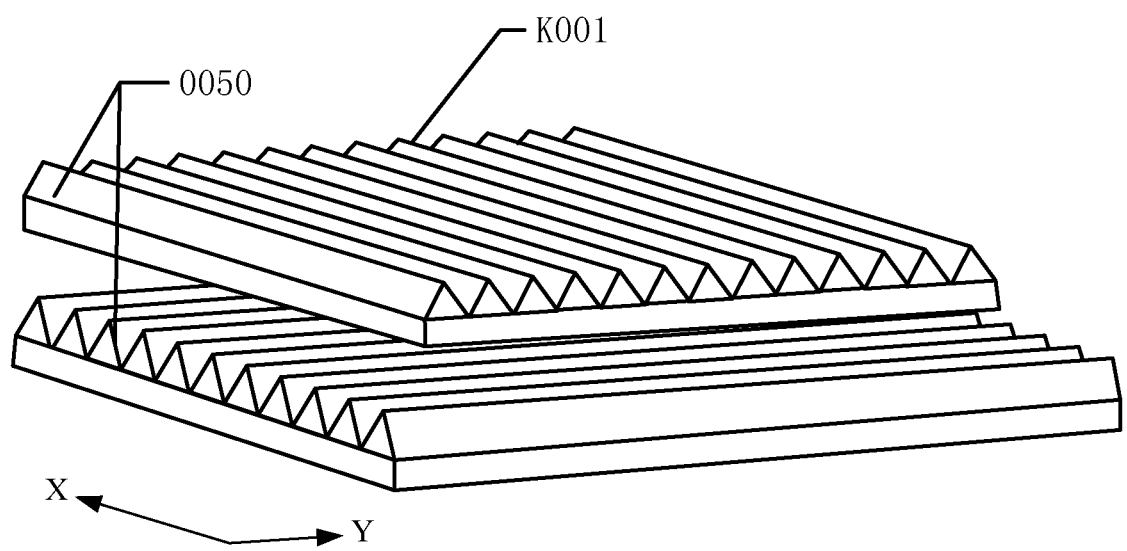
FIG. 2 illustrates a prism.
Figure 3:
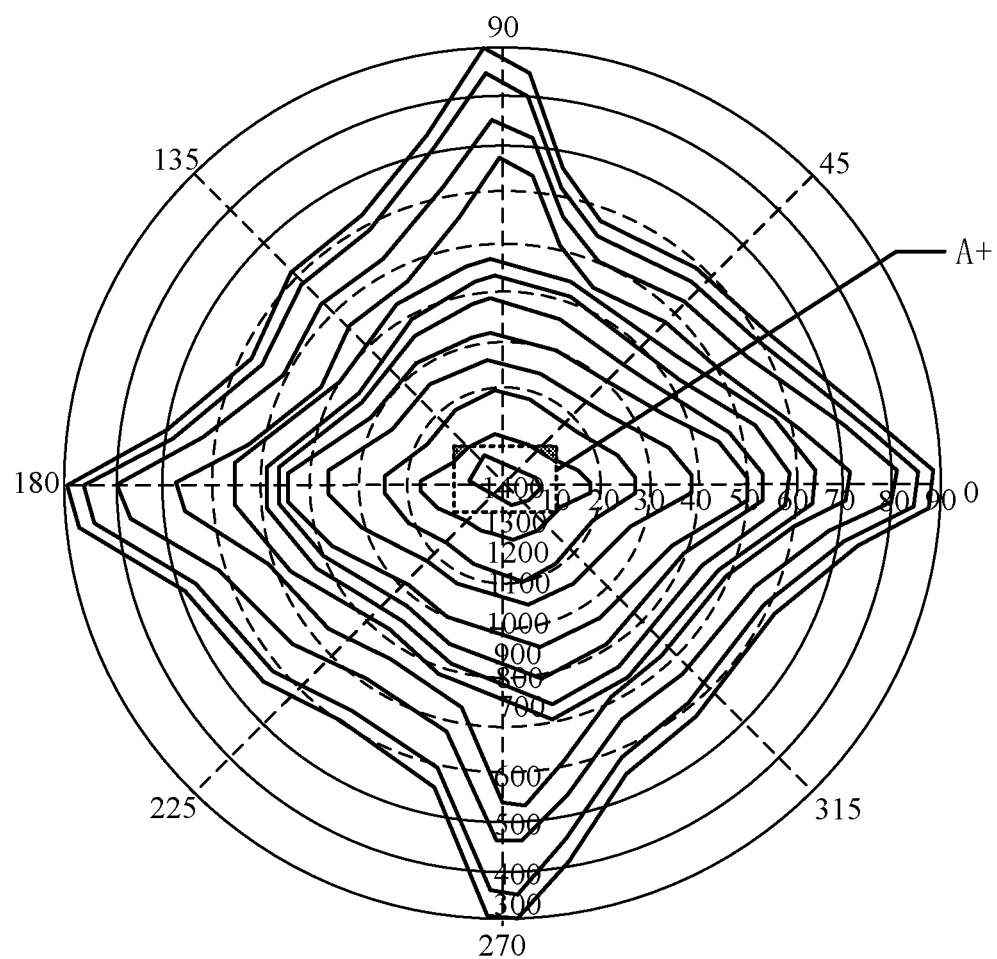
FIG. 3 illustrates a contour plot of contrast of the backlight module in FIG. 1.

FIG. 1 illustrates a backlight module, FIG. 2 is a schematic structural diagram of a prism, and FIG. 3 is a schematic diagram of the contrast contour of the backlight module in FIG. 1. The backlight module 000 in FIG. 1 is a side-entry type backlight module. As shown in FIG. 1, the backlight module 000 includes a side-entry type backlight 001, a light guide plate 002 opposite to the side-entry type backlight source 001, and a reflector 003 located on the side of the light guide plate 002 away from the light-exiting surface K001 of the backlight module. The light emitted by the side-entry type backlight source 001 enters the light guide plate 002, passes through the reflector003, is reflected to the light-exiting surface K001 of the backlight module, and then passes through the lower diffuser 004, the prism 005, and the upper diffuser 006, and then emits. When the light passes through the prism 005, the prism 005 deflects the light. The prism 005 usually includes two layers. The first layer of the prism 005 has triangular prism strips 0050 extending along a row direction and arranged in a column direction, and the second layer of the prism 005 includes triangular prism strips 0050 extending along the column direction and arranged in the row direction, and the top angles of the triangular prism strips 0050 all face the light-exiting surface K001 of the backlight module. When the light passes through the side surfaces of the triangle stripes 0050, it is deflected to the direction of larger angles, and this results in more light at the larger angles. FIG. 3 is a contour map of the contrast of the light modulated by the prism 005. The contrast refers to the brightness ratio between the brightest white and the darkest black when the backlight module emits light. For the backlight module, it is usually required that the contrast of the small viewing angle area A+ area is greater than or equal to 1300. The deflected angle of the light modulated by the prism 005 is relatively large, while in the small viewing angle area, there is less light, which results in the contrast of the small viewing angle area being less than 1300. As shown in FIG. 3, the contrasts of the positions of the upper left and upper right corners of the small viewing angle area A+ area are not within the range of the contour line of 1300 (the filled region in FIG. 3). Accordingly, the contrast requirement cannot be met at this time.

The present disclosure provides a backlight module and a display device to solve the above problems. The specific embodiments of the backlight module and the display device will be described in detail below.

Figure 4:
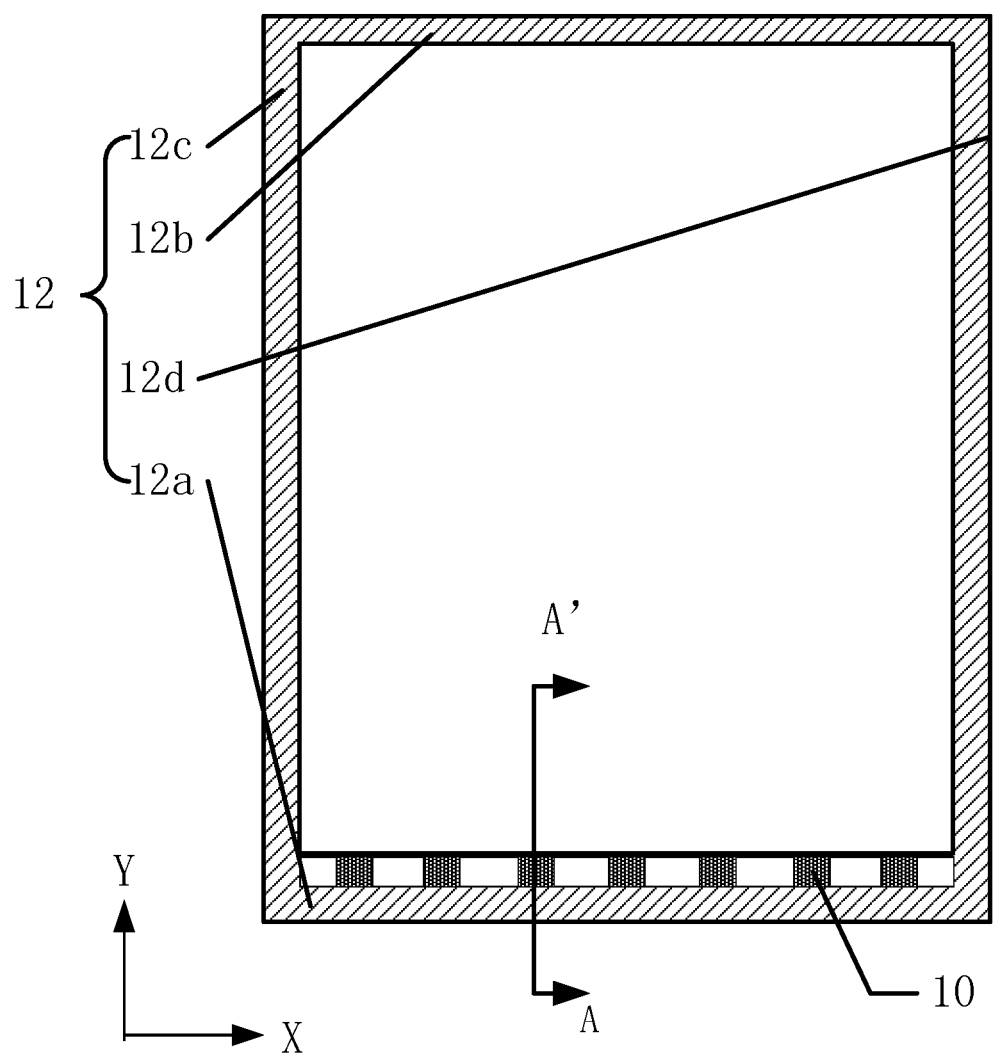
FIG. 4 illustrates an exemplary backlight module according to various disclosed embodiments of the present disclosure.
Figure 5:
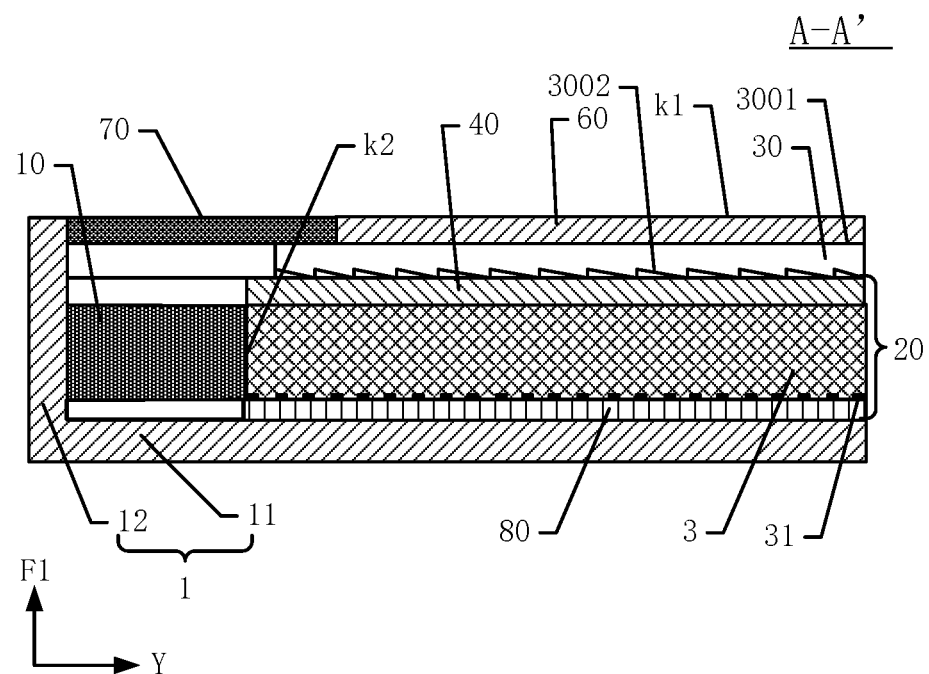
FIG. 5 illustrates an A-A'-sectional view in FIG. 4.
Figure 6:
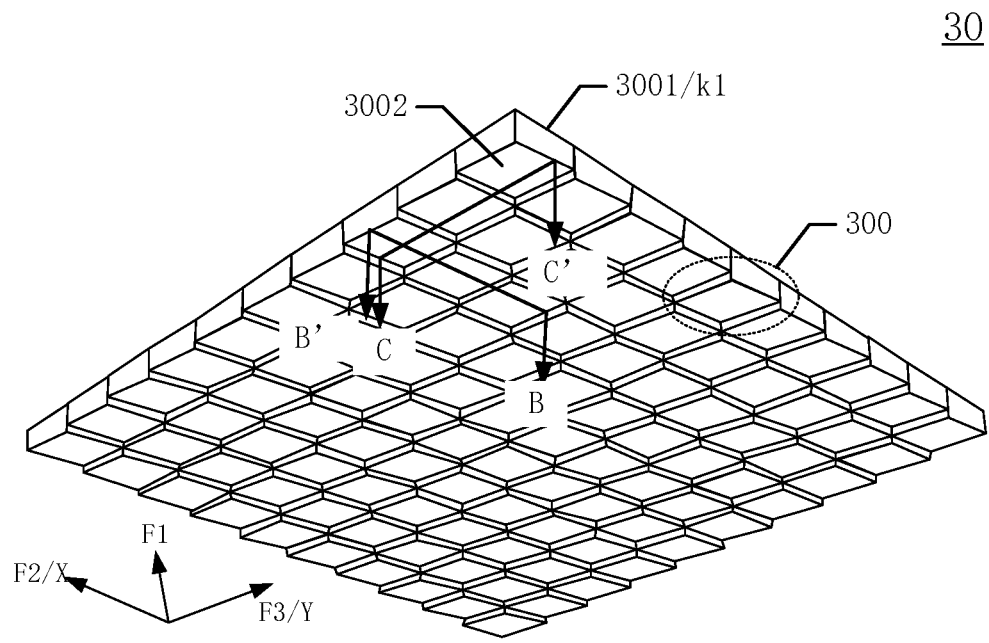
FIG. 6 illustrates an exemplary light-adjusting layer according to various disclosed embodiments of the present disclosure.
Figure 7:
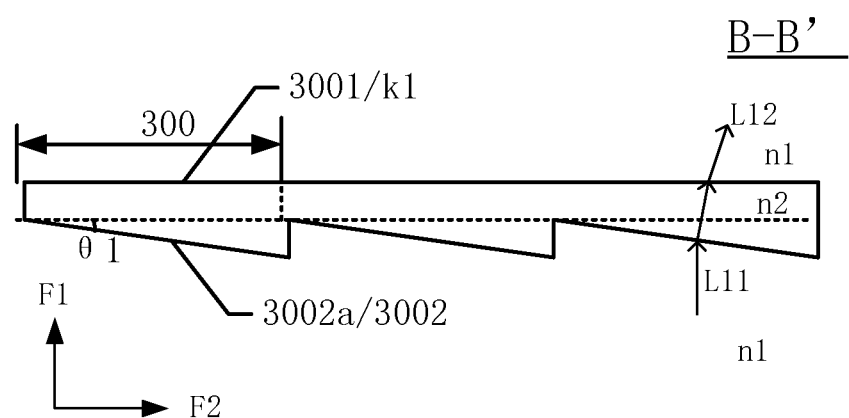
FIG. 7 illustrates a B-B'-sectional view in FIG. 6.
Figure 8:
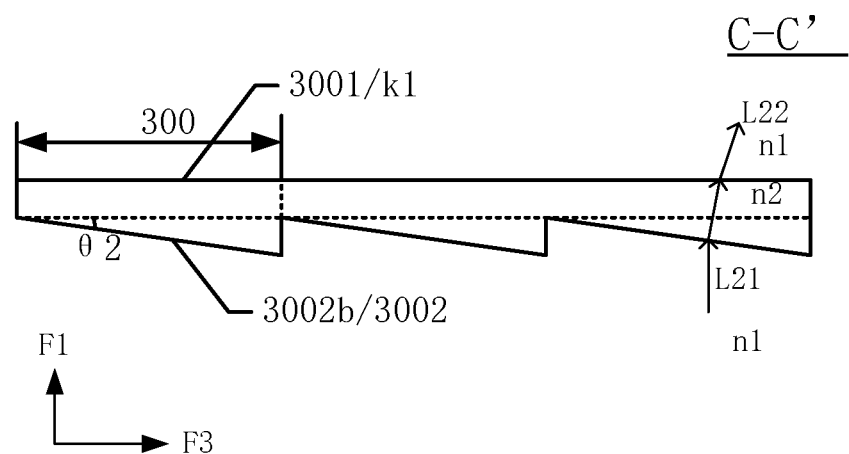
FIG. 8 illustrates a C-C'-sectional view in FIG. 6.
Figure 9:
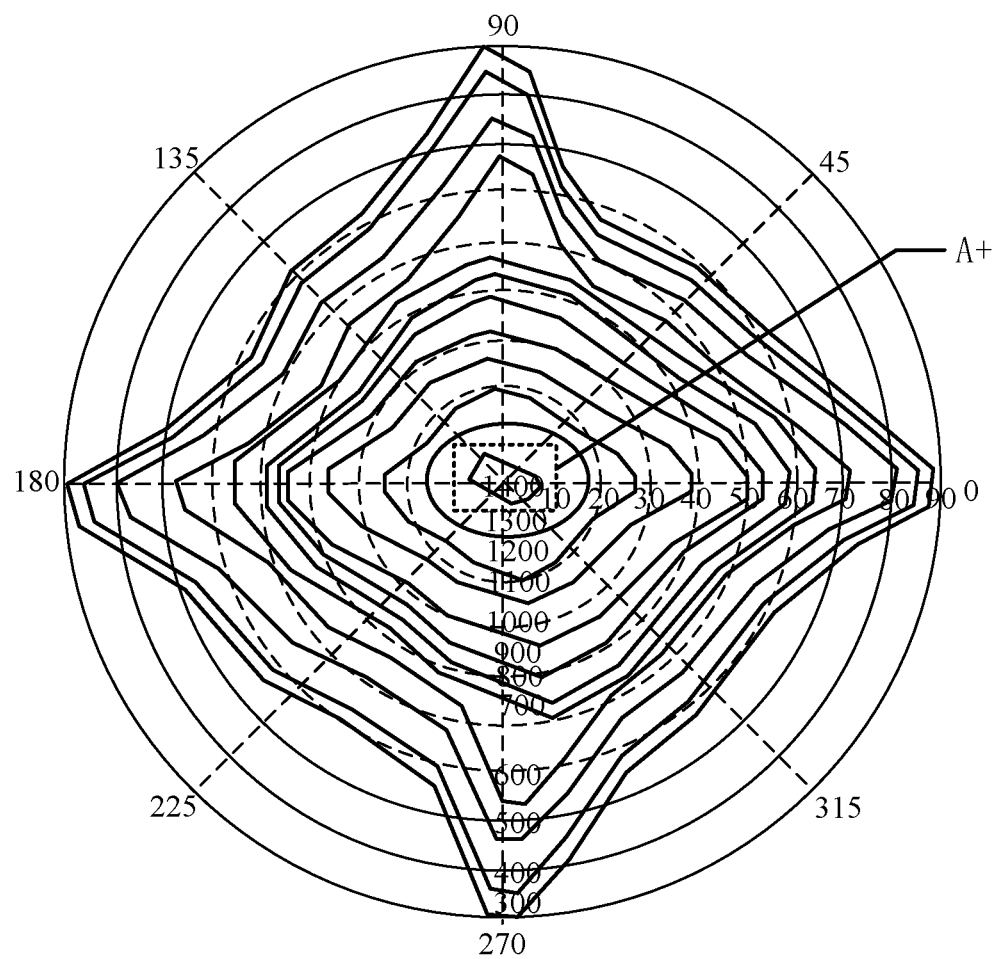
FIG. 9 illustrates another exemplary contour plot of contrast of the backlight module in FIG. 4.

FIG. 4 is a schematic plan view of an exemplary backlight module provided by the present disclosure. FIG. 5 an A-A'-sectional view in FIG. 4. FIG. 6 is a schematic structural view of an exemplary light-adjusting layer provided by the present disclosure. FIG. 7 is a B-B'-sectional view in FIG. 6. FIG. 8 is a C-C'-sectional view in FIG. 6. FIG. 9 is a schematic diagram of an exemplary contrast contour of the backlight module in FIG. 4. The structure of the light-adjusting layer 30 in may also be referred to FIG. 6.

As shown in FIGS. 4-9, the backlight module 1000 may include a light-emitting unit 10 and an optical film 20. The light provided by the light-emitting unit 10 may pass through the optical film 20 and propagate along a first direction F1. The first direction F1 may be perpendicular to the light-exiting surface k1 of the backlight module. The backlight module 1000 may also include a light-adjusting layer 30 located on a side of the optical film 20 adjacent to the light-exiting surface k1. The light-adjusting layer 30 may include a plurality of light-adjusting units 300. A light-adjusting unit 300 may include a first surface 3001 and a second surface 3002 oppositely arranged along the first direction F1. The first surface 3001 may be located on the side of the second surface 3002 adjacent to the light-exiting surface k1 of the backlight module 1000. The second surface 3002 may include at least a first sub-surface 3002a and a second sub-surface 3002b. The first surface 3001 may be a flat surface. Along a second direction F2, the plane where the first sub-surface 3002a is located may intersect the plane where the first surface 3001 is located, and the first sub-surface 3002a may be inclined to the side away from the light-exiting surface k1 of the backlight module 1000. Along the third direction F3, the plane where the second sub-surface 3002b is located may intersect the plane where the first surface 3001 is located, and the second sub-surface 3002b may be inclined to the side away from the light-exiting surface k1 of the backlight module 1000. The first direction F1 and the second direction F2 may both intersect the third direction F3. The second direction F2 and the third direction F3 may be parallel to the light-exiting surface k1 of the backlight module 1000.

The backlight module 1000 of the present disclosure may be a side-entry type backlight module, or a direct-down type backlight module. FIG. 4 and FIG. 5 schematically describes the side-entry type backlight module as an example. As shown in FIG. 5, the light-exiting surface k2 of the light-emitting unit 10 of the side-entry type backlight module 1000 may intersect the light-exiting surface k1 of the backlight module 1000. The backlight module 1000 may include a housing 1. The housing 1 may include a bottom plate 11 and a side plate 12. The side plate 12 and the bottom plate 11 may form an accommodating cavity to accommodate the optical film 20 and the light-adjusting layer 30. The side plate 12 may include a first side plate 12, a second side plate 12b, a third side plate 12c and a fourth side plate 12d. The first side plate 12a and the second side plate 12b may be located on the opposite sides of the bottom plate 11 along the column direction Y. The third side plate 12c and the fourth side plate 12d may be located on opposite sides of the bottom plate 11 along the row direction X, and the accommodation cavity may be formed between the bottom plate 11, the first side plate 12a, the second side plate 12b, the third side plate 12c and the fourth side plate 12d, and the light-emitting unit 10 may be located between the optical film 20 and the first side plate 12a.

In one embodiment, the optical film 20 may include a light guide plate 3. The light guide plate 3 may be opposite to the light-emitting unit 10 in the column direction Y. The optical film 20 may further include a lower diffuser 40 located on the side of the light guide plate 3 adjacent to the light-exiting surface k1 of the backlight module 1000, and a reflector 80 may be further included on the side of the light guide plate 3 away from the light-exiting surface k1 of the backlight module. Dots 31 may be also provided on the light guide plate 3. The light-adjusting layer 30 may further include an upper diffuser 60 on the side away from the optical film 20, and a light-shielding film 70 may also be provided at a position corresponding to the non-display area of the backlight module 1000 and may be configured to prevent the light leakage in the non-display area.

The light-adjusting layer 30 in FIG. 6 may include a plurality of light-adjusting units 300. In FIG. 6, only the close arrangement of the light-adjusting units 300 is used for schematic illustration. In some other embodiments, the light-adjusting units 300 may also have certain intervals, which is not shown here. Referring to FIG. 5, for the light-adjusting layer 30, it may be the second surface 3002 of the light-adjusting unit 300 that mainly deflects the light output from the optical film 20. The number of light-adjusting units 300 in FIG. 6 is only a schematic illustration and is not intended to limit the number of light-adjusting units 300 in actual products. In FIGS. 6-8, pattern filling is not performed on the light-adjusting units 300.

A light-adjusting unit 300 may include a first surface 3001 and a second surface 3002 disposed opposite to each other along the first direction F1. The first surface 3001 may be located on the side of the second surface 3002 adjacent to the light-exiting surface k1 of the backlight module 1000. The first surface 3001 may be flat, for example, the side of the light-adjusting unit 300 adjacent to the light-exiting surface k1 of the backlight module 1000 may be a flat surface, and the first surface 3001 may have no effect on light deflection.

Referring to FIG. 5 and FIG. 6, the second surface 3002 may at least include a first sub-surface 3002a and a second sub-surface 3002b. Along the second direction F2, the plane where the first sub-surface 3002a is located may intersect the plane where the first surface 3001 is located, and the second sub-surface 3002a may be inclined to the side away from the light-exiting surface k1 of the backlight module 1000. The first direction F1 may intersect the second direction F2, and the second direction F2 may be parallel to the light-exiting surface k1 of the backlight module 1000. As shown in FIG. 7, the light L11 may enter the light-emitting unit 300, because the first sub-surface 3002a may be inclined to the side away from the light-exiting surface k1 of the backlight module 1000, and the refractive index of the light-emitting unit 300 mat be greater than that of air, the emitted light of the light L11 after passing through the first sub-surface 3002a may be the light L12. The light L12 may be deflected in a direction to a smaller angle, and may have a certain angle with the first direction F1. Along the third direction F3, the plane where the second sub-surface 3002b is located may intersect the plane where the first surface 3001 is located, and the second sub-surface 3002b may be inclined to the side away from the light-exiting surface k1 of the backlight module 1000. The first direction F1 and the third direction F3 may intersect each other, and the second direction F2 and the third direction F3 may be parallel to the light-exiting surface k1 of the backlight module 1000. As shown in FIG. 8, the light L21 may enter the light-adjusting unit 300, because the second sub-surface 3002B may be inclined to the side away from the light-exiting surface k1, and the refractive index of the light-adjusting unit 300 may greater than that of air, the emitted light of the light L21 after the light L21 passes through the first sub-surface 3002*a* may be the light L22, and the light L22 may be deflected in the direction of a smaller angle, and may have a certain angle with the first direction F1. The inclination angles relative to the first sub-surface 3002*a* and the second sub-surface 3002*b* may be θ1 and θ2 respectively, and θ1 and θ2 may be or may not be equal, which is not specifically limited here. When θ1 and θ2 are equal, the deflection angles of the light in the first direction F1 and in the second direction F2 may be the same.

It should be noted that in the present disclosure, the light emitted from the optical film 20 may be considered to have no directionality, for example, the light emitted from the optical film 20 may propagate in a direction perpendicular to the light-exiting surface k1 of the backlight module 1000, and then enter the light-adjusting layer 30. In addition, the refractive index of the light-adjusting layer 30 here may be greater than that of air. The light emitted from the optical film 20 may enter the air between the optical film 20 and the light-adjusting layer 30, and then enter the light-adjusting layer 30 from the air. Accordingly, it may be equal to from the light sparse area to the light dense area.

In some embodiments, the material of the light-adjusting layer 30 may include polymethyl methacrylate (PAA), the refractive index n2 of which may be generally 1.49, and the refractive index n1 of air is 1.00029. Thus, the refractive index of the light-adjusting layer 30 may be greater than the refractive index of air. In addition, the small viewing angle area A+ area referred in the present disclosure may refer to the area having angle with the first direction F1 within 10°. According to the refractive index formula n1 sin α1=n2 sin α2, the light entering the light-adjusting layer 30 from the air may have one time refraction, and from the light-adjusting layer 30 to the upper layer (the side of light-adjusting layer 30 close to the light-emitting surface k1 of the backlight module) air, the light may refract again, to cause the light to be deflected to about 10° (that is, the angle between the light and the first direction F1 is about 10° after it is emitted from the light-adjusting layer 30 and enters the upper air,), it may be calculated that the inclination angle of the first sub-surface 3002*a* and the second sub-surface 3002*b* may be approximately 3.5°. When the refractive indexes of the materials are different, the oblique overlap between the sub-surface 3002*a* and the second sub-surface 3002*b* may also change accordingly, which is not specifically limited here. The light emitted by the backlight module may be deflected towards the small viewing angle area through analyzing the backlight module of this embodiment using ANSYS software.

Referring to FIGS. 7-8, the first sub-surface 3002*a* and the second sub-surface 3002*b* may be understood as two sub-surfaces intersecting in the second direction F2 and the third direction F3. It can be understood that, along the second direction F2, the light-adjusting unit 300 may include a surface inclined to the side away from the light-exiting surface k1 of the backlight module, and at the same time, along the third direction F3, the light-adjusting unit 300 may also include a surface inclined to the side away from the light-exiting surface k1 of the backlight module. In such a configuration, the light-adjusting unit 300 may deflect light in both the second direction F2 and the third direction F3 such that the luminous flux in the second direction F2 and the third direction F3 may both be increased. The contrast may be increased after the luminous flux is increased in the second direction F2 and the third direction F3. It can be seen from the contrast contour diagram in FIG. 9 that after the backlight module 1000 of the present disclosure is provided with the light-adjusting layer 30, the contour line with a contrast ratio of 1300 may be expanded in the left and right directions and in the up and down directions. Thus, the contrast of the small viewing angle area A+ area may be completely covered within the contour line with a contrast ratio of 1300, and the contrast of the small viewing angle A+ area may meet the requirements.

It should be noted that the contrast in the present disclosure refers to the brightness ratio between the brightest white and the darkest black when the backlight module 1000 emits light. When the light emitted from the optical film 20 is deflected to the small viewing angle area A+ area, and after the luminous flux is increased, the brightness of the brightest white may be increased, and the contrast may also be increased.

The height, size, spacing, arrangement, material, and surface treatment of the light-adjusting unit 300 in the first direction may be adjusted according to product differences to meet the contrast requirements of other viewing angles.

Compared with related technologies, the backlight module 1000 of this embodiment may have at least the following beneficial effects.

In the present disclosure, the prism in the related art may be replaced by the light-adjusting layer 30. The prism in the related art needs to be set as two layers of prism strips (refer to the structure in FIG. 2). One layer of prism strips extend along the row direction X and are arrange along the column direction Y. The other layer of prism strips extend along the column direction Y and are arranged in the row direction X. The manufacturing process is relatively complicated. The present disclosure only uses one layer of light-adjusting layer 30 to replace the prism in the related art, the manufacturing process may be simplified and the cost may not be increased.

The angle of light deflected by the prism in the related art is too large, resulting in more light at a large viewing angle and less light at a small viewing angle, thus the contrast of the small viewing angle area cannot meet the requirements. The light-adjusting layer 30 in the present disclosure may include a plurality of light-adjusting units 300. The light-adjusting unit 300 may include a first surface 3001 and a second surface 3002 oppositely arranged along the first direction F1. The first surface 3001 may be located on the second surface 3002 adjacent to a side of the light-exiting surface k1 of the backlight module. The second surface 3002 may include at least a first sub-surface 3002*a* and a second sub-surface 3002*b*. Along the second direction F2, the light-adjusting unit 300 may have a surface inclining to a side away from the light-exiting surface k1 of the backlight module. While along the third direction F3, the light-adjusting unit 300 may also have a surface inclined to the side away from the light-exiting surface k1 of the backlight module. Thus, the light-adjusting unit 300 may simultaneously have deflection effects on the light in the second direction F2 and the third direction F3 such that the light in the second direction F2 and the third direction F3 may be increased. The contrast may be increased after the luminous flux in the second direction F2 and the third direction F3 are increased; and the luminous flux in the small viewing angle area may be increased after the deflection. Thus, the contour line with a contrast ratio of 1300 may be expanded in the left, right and up and down directions. Accordingly, the contrast of the small viewing angle area A+ area may be completely covered by the contour line with a contrast ratio of 1300, and the contrast of the small viewing angle area A+ area may meet the requirements.

Figure 10:
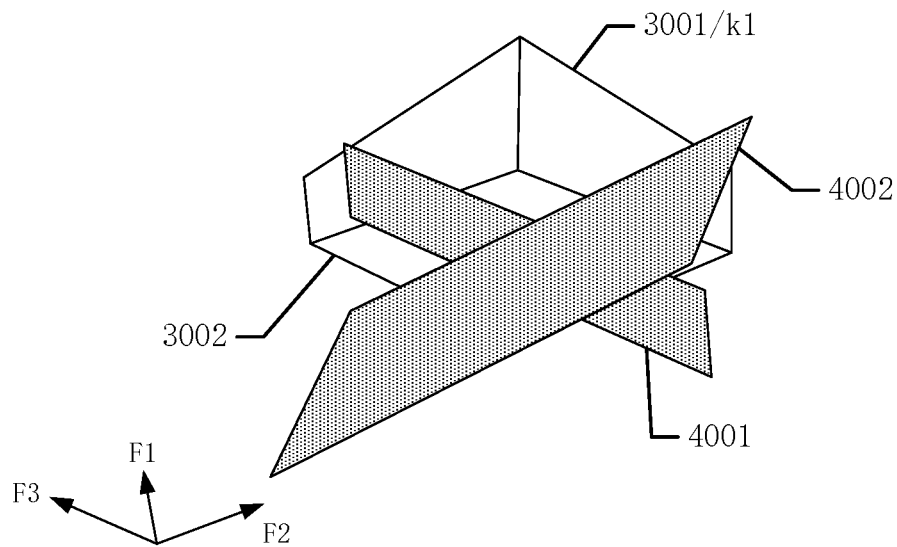
FIG. 10 illustrates an exemplary light-adjusting unit according to various disclosed embodiments of the present disclosure.
Figure 11:
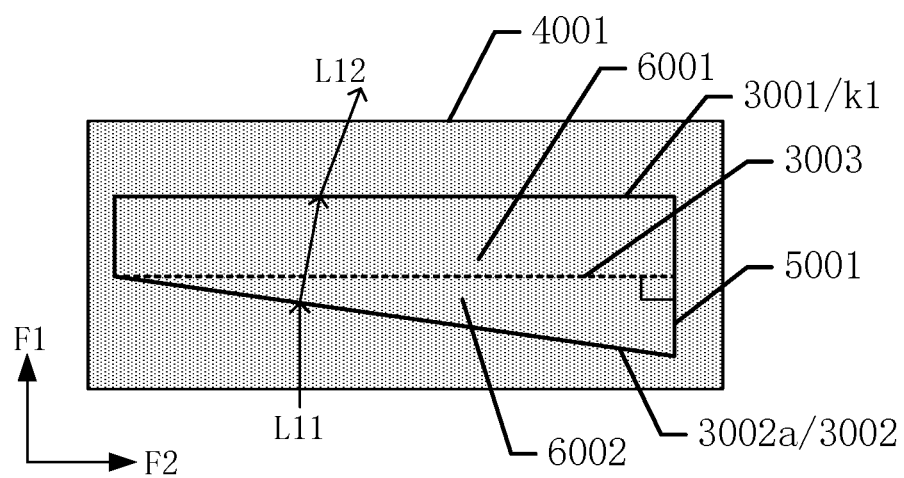
FIG. 11 illustrates an exemplary orthographic projection of a light-adjusting unit on a first cross-section according to various disclosed embodiments of the present disclosure.
Figure 12:
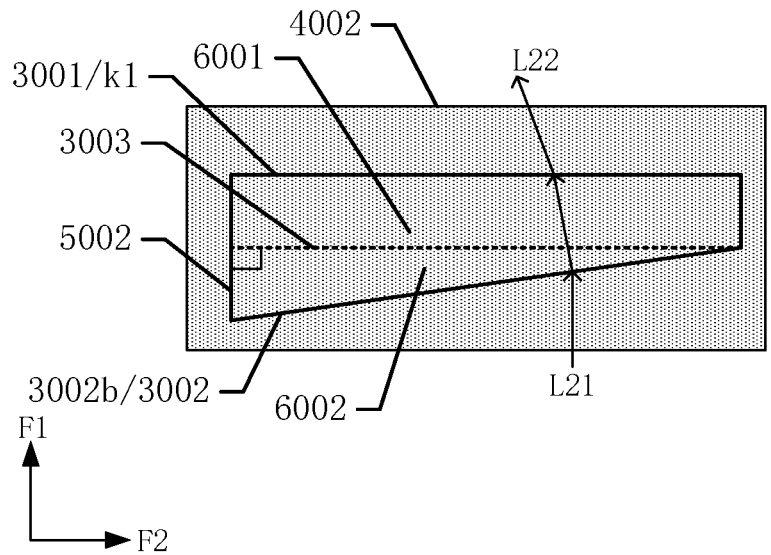
FIG. 12 illustrates an exemplary orthographic projection of a light-adjusting unit on a second cross-section according to various disclosed embodiments of the present disclosure.

FIG. 10 is a schematic structural diagram of an exemplary light-adjusting unit provided by the present disclosure. FIG. 11 is a schematic diagram of an orthographic projection of the light-adjusting unit on a first cross-section. FIG. 12 is a schematic diagram of the orthographic projection of the light-adjusting unit on a second cross-section. As shown in FIGS. 10-12, in one embodiment, the light-adjusting unit 300 may include a substrate 6001 and a microstructure 6002 bonded together. The substrate 6001 may include a first surface 3001, and the microstructure 6002 may include a second surface 3002 and a third surface 3003 located on the side of the second surface 3002 adjacent to the substrate 6001. The third surface 3003 may be a flat surface. A first vertical plane 5001 along the first direction F1 may pass through the first sub-surface 3002a and the third surface 3003. As shown in FIG. 11, the projection of the microstructure 6002 on the first cross-section 4001 may be a right triangle. The first cross-section 4001 may pass through the first sub-surface 3002a, the third surface 3003 and the first vertical plane 5001. The angle formed by the third surface 3003 and the first vertical plane 5001 may be a right angle. The second vertical plane 5002 along the first direction F1 may pass through the second sub-surface 3002b and the third surface 3003. As shown in FIG. 12, the orthographic projection of the microstructure 6002 on the second cross-section 4002 may be a right triangle. The second cross-section 4002 may pass through the second surface 3002b, the third surface 3003 and the second vertical surface 5002. The angle formed by the third surface 3003 and the first vertical surface 5001 may be a right angle.

FIG. 10 illustrates an exemplary light-adjusting unit 300. The substrate 6001 and the microstructure 6002 of the light-adjusting unit 300 may be an integral structure, and the microstructure 6002 may be formed by etching or other methods. It can be understood that the orthographic projection of the first vertical plane 5001 on the microstructure 6002 may be a straight line. Similarly, the orthographic projection of the second vertical plane 5002 on the microstructure 6002 may be a straight line. The orthographic projection of the microstructure 6002 on the first cross-section 4001 may be a right triangle, and the shape of the orthographic projection of the microstructure 6002 on the second cross-section 4002 may be a right triangle. The microstructure 6002 may include the first subsurface 3002a and the second subsurface 3002b. Along the second direction F2, the microstructure 6002 may include the first sub-surface 3002a inclining to the side away from the light-exiting surface k1 of the backlight module, and along the third direction F3, the microstructure 6002 may also include the second sub-surface 3002b inclining to the side away from the light-exiting surface k1 of the backlight module. The light in the first direction F1 may be deflected after passing through the first sub-surface 3002a and the second sub-surface 3002b of the microstructure 6002, and the microstructure 6002 may simultaneously deflect the light in the second direction F2 and the third direction F3, such that the light in the second direction F2 and the third direction F3 may both be increased, and the contrast may be increased after the luminous flux in the second direction F2 and the third direction F3 is increased. Accordingly, the luminous flux in the small viewing angle area after the deflection may be increased. As shown in FIG. 9, the contour line with a contrast of 1300 may be expanded in the left, right and up and down directions. Accordingly, the contrast of the small viewing angle area A+ area may be completely covered by the contour line with a contrast ratio of 1300, the contrast of the small viewing angle area A+ area may meet the requirements.

Figure 13:
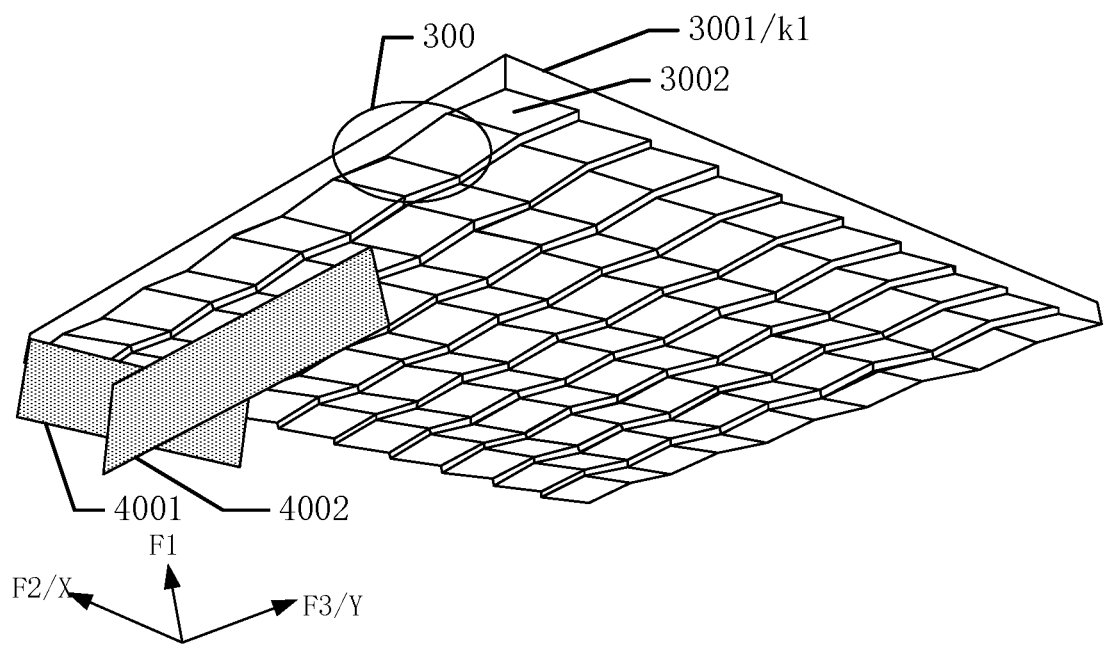
FIG. 13 illustrates another exemplary light-adjusting layer according to various disclosed embodiments of the present disclosure.
Figure 14:
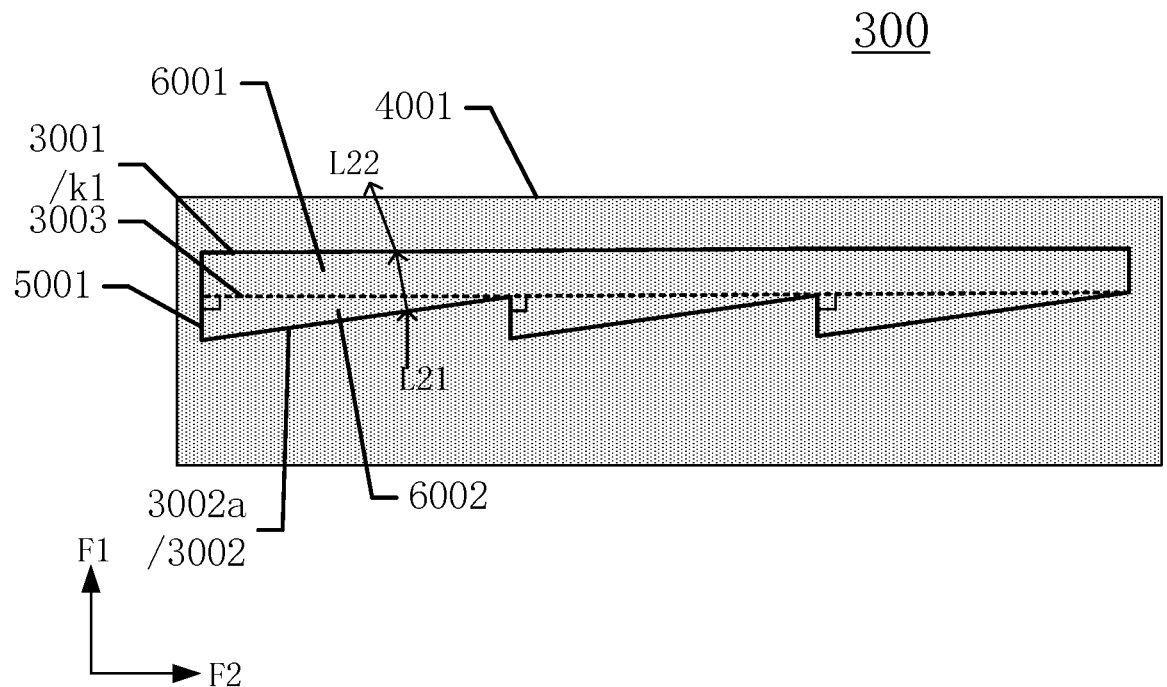
FIG. 14 illustrates an exemplary orthographic projection of a light-adjusting unit on a first cross-section according to various disclosed embodiments of the present disclosure.
Figure 15:
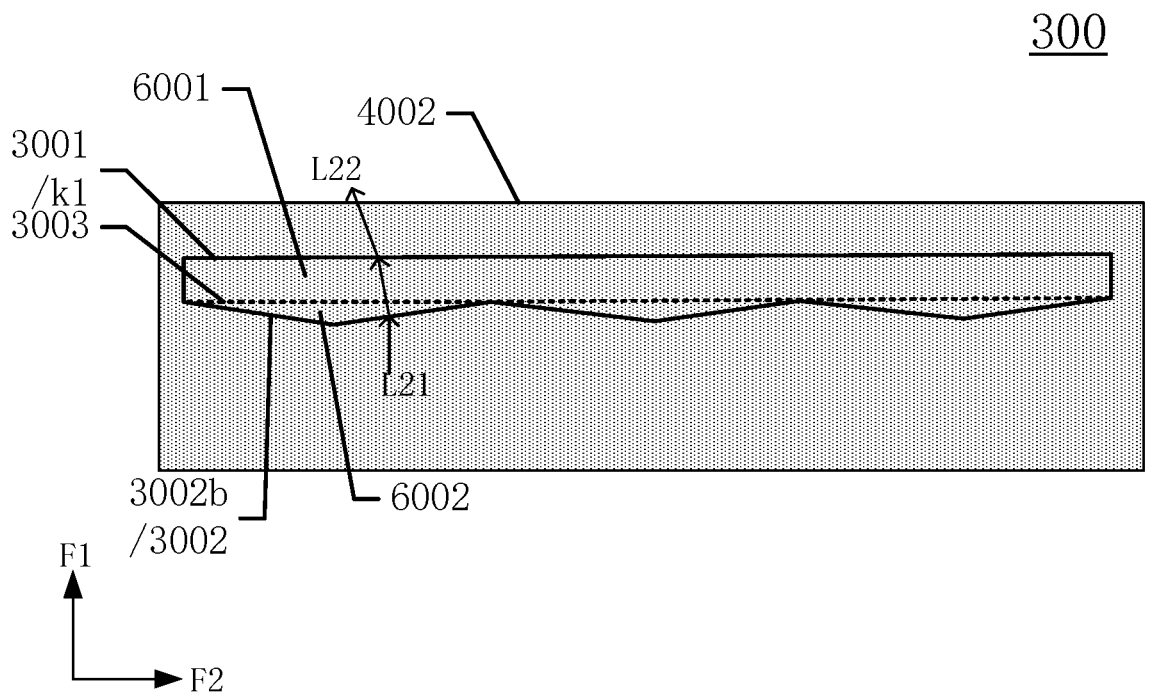
FIG. 15 illustrates an exemplary orthographic projection of a light-adjusting unit on a second cross-section according to various disclosed embodiments of the present disclosure.

FIG. 13 is a schematic structural diagram of another exemplary light-adjusting layer provided by the present disclosure. FIG. 14 is an orthographic projection of the light-adjusting unit on a first cross-section. FIG. 15 is a schematic diagram of the orthographic projection of the light-adjusting unit on a second cross-section. As shown in FIGS. 13-15, in some embodiments, the light-adjusting unit 300 may include a substrate 6001 and a microstructure 6002 bonded together. The substrate 6001 may include a first surface 3001, and the microstructure 6002 may include a second surface 3002 and a third surface 3003 located on the side of the second surface 3002 adjacent to the substrate 6001. The third surface 3003 may be a flat surface. In FIG. 14, the first vertical plane 5001 along the first direction F1 may pass through the first sub-surface 3002a and the third surface 3003. The shape of the orthographic projection of the microstructure 6002 on the first cross-section 4001 may be a right triangle. The first cross-section 4001 may pass through the first sub-surface 3002a, the third surface 3003 and the first vertical plane 5001. The angle formed by the third surface 3003 and the first vertical plane 5001 may be a right angle. In FIG. 15, the shape of the orthographic projection of the microstructure 6002 on the second cross-section 4002 may be a right triangle, and the second cross-section 4002 may pass through the second sub-surface 3002b and the third surface 3003.

In FIG. 13, pattern filling is not performed on the light-adjusting layer 30, and the light-adjusting layer 30 may include a plurality of light-adjusting units 300. In FIG. 13, the configuration that the light-adjusting units 300 are arranged closely without intervals is used as an example for schematic illustration.

Figure 16:
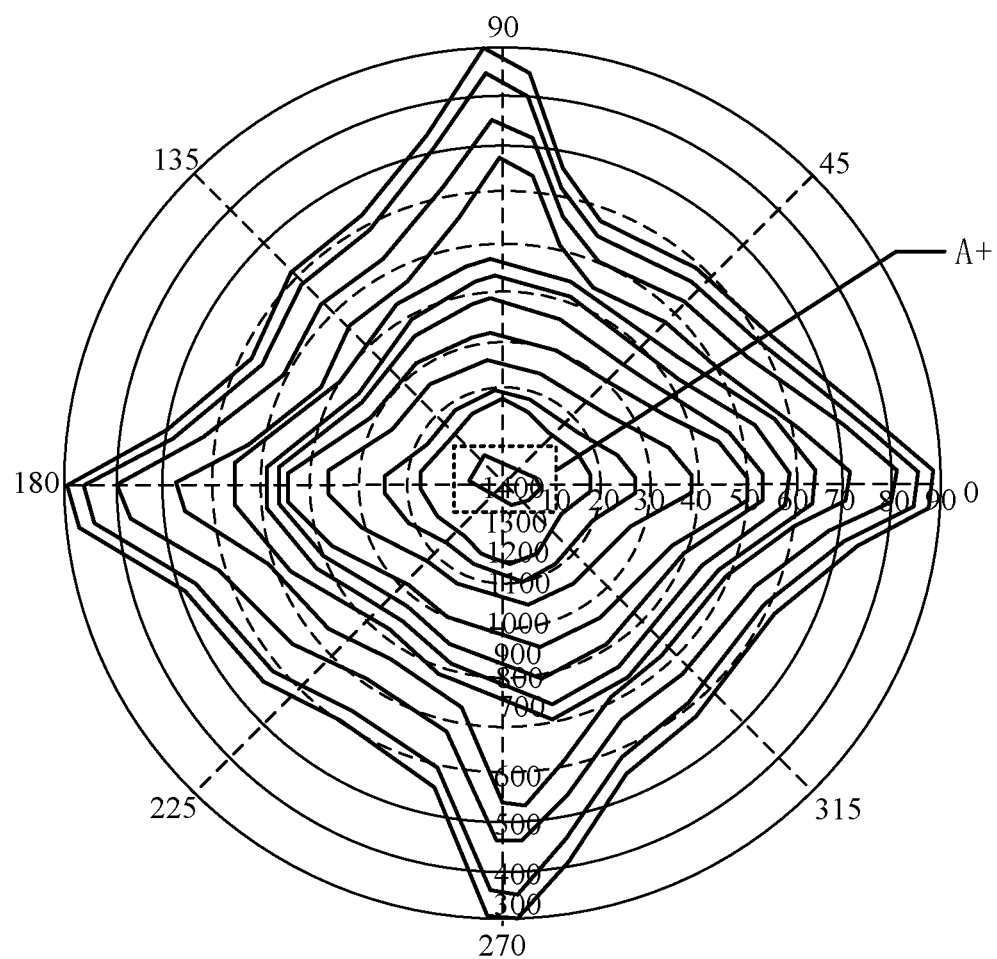
FIG. 16 illustrates an exemplary contour plot of contrast of a backlight module after using the light-adjusting layer in FIG. 13.

The substrate 6001 and the microstructure 6002 of the light-adjusting unit 300 may be an integral structure, and the microstructure 6002 may be formed by etching or other methods. It can be understood that the orthographic projection of the first vertical plane 5001 on the microstructure 6002 may be a straight line, the shape of the orthographic projection of the microstructure 6002 on the first cross-section 4001 may be a right triangle, and the orthographic projection of the microstructure 6002 on the second cross-section 4002 may be a right triangle. The microstructure 6002 may include a first sub-surface 3002a and a second sub-surface 3002b. Along the second direction F2, the microstructure 6002 may include the first sub-surface 3002a inclining to the side away from the light-exiting surface k1 of the backlight module. Along the third direction F3, the microstructure 6002 may also include the second subsurface 3002b inclining to the side away from the light-exiting surface k1 of the backlight module. As shown in FIG. 15, the two sides of the isosceles triangle of the second subsurface 3002b may play the role in adjusting light. The light in the first direction F1 may be deflected after passing through the first sub-surface 3002a and the second sub-surface 3002b of the microstructure 6002, and the microstructure 6002 may simultaneously deflect the light in the second direction F2 and the third direction F3 such that the light in the second direction F2 and the third direction F3 may be increased. The contrast may be increased after the luminous flux in the second direction F2 and the third direction F3 is increased. Accordingly, the luminous flux in the small viewing angle area may be increased after the deflection. FIG. 16. illustrates the contrast contour of the backlight module 1000 after utilizing the light-adjusting layer 30 in FIG. 13. As shown in FIG. 16, the contour line of 1300 may be expanded in the left and right directions, especially in the up and down directions. Thus, the contrast of the small viewing angle area A+ area may be completely covered within the contour line of 1300, and the contrast of the small viewing angle area A+ area may fulfil the requirements.

In some embodiments, referring to FIG. 7, FIG. 8, FIG. 11, FIG. 12, FIG. 14 and FIG. 15, the angle between the first sub-surface 3002a and the light-exiting surface k1 of the backlight module may be greater than or equal to approximately 2° and less than or equal to approximately 5°, and the angle between the second sub-surface 3002b and the light-exiting surface k1 of the backlight module may be greater than or equal to approximately 2° and less than or equal to approximately 5°.

In the present disclosure, it is considered that the light emitted from the optical film 20 has no directionality. For example, the light emitted from the optical film 20 may propagate in a direction perpendicular to the light-exiting surface k1 of the backlight module, and then enter the light-adjusting layer 30. In addition, the refractive index of the light-adjusting layer 30 here may be greater than that of air. The light emitted from the optical film 20 may enter the air between the optical film 20 and the light-adjusting layer 30, and then enter the light-adjusting layer 30 from the air; and it may be equal to from light sparse to light dense. In some embodiments, the material of the light-adjusting layer 30 may be polymethyl acrylate (PMA), whose refractive index may be generally 1.49, and the refractive index of air may be 1.00029, that is, the refractive index of the light-adjusting layer 30 may be greater than that of air. In addition, the small viewing angle area A+ area referred to in the present disclosure may refer to the area that has an angle of 10° with the first direction F1. According to the refractive index formula $n_1 \sin \alpha_1 = n_2 \sin \alpha_2$, the inclination angle between the first sub-surface 3002a and the second sub-surface 3002b may be calculated as approximately 3.5°, which may make the light deflect to approximately 10°. The inclination and overlap of the first sub-surface 3002a and the second sub-surface 3002b may also be changed accordingly due to the difference in material refractive index. Considering there may be a process error between the first sub-surface 3002a and the second sub-surface 3002b during the fabrication process, to prevent the angle between the first sub-surface 3002a and the light-exiting surface k1 of the backlight module from being too large or too small due to process errors, and the angle between the second sub-surface 3002b and the light-exiting surface k1 of the backlight module too small due to the process errors, resulting in the angle between the final deflected light and the first direction F1 exceeding 10°, the angle between the first sub-surface 3002a and the light-exiting surface k1 of the backlight module in the present disclosure may be greater than or equal to approximately 2° is less than or equal to approximately 5°, and the angle between the second sub-surface 3002b and the light-exiting surface k1 of the backlight module may be greater than or equal to approximately 2° and less than or equal to approximately 5°. In such a configuration, even if there are process errors in the production of the first sub-surface 3002a and the second sub-surface 3002b, it may ensure that the angle between the first sub-surface 3002a and the light-exiting surface k1 of the backlight module may not be too large or too small, the angle between the second sub-surface 3002b and the light-exiting surface k1 of the backlight module may not be too large or too small, and the angle between the final light after deflection and the first direction F1 may not exceed 10°. Accordingly, the contrast of the small viewing angle area A+ area may be completely covered within the contour line with a contrast of 1300, and the contrast ratio of the small viewing angle area A+ area may fulfil the requirements.

In some embodiments, referring to FIG. 6 and FIG. 13, the orthographic projection areas of the light-adjusting units 300 on the light-exiting surface k1 of the backlight module may all be equal, and there may be no gap between adjacent light-adjusting units 300.

It can be understood that it may be the light-adjusting unit 300 that deflects the light emitted from the optical film 20 (the light-emitted from the optical film 20 may pass through the light-adjusting unit 300 and then may be deflect to the small viewing angle area A+ area), so the tighter the arrangement of the light-adjusting units 300, the more uniform the light deflection effect on the optical film 20. If there is a gap between the light-adjusting units 300, then there may be light from the optical film 20 directly emitted from the gap between the light-adjusting units 300, and this part of the light may not be deflected, but continue along the first direction F1. In this way, only the light at the corresponding position of the light-adjusting unit 300 may be deflected into the small viewing angle area A+ area, resulting in uneven light emitted from the backlight module 1000. In this embodiment, there may be no interval between adjacent light-adjusting units 300 such that all the emitted light of the optical film 20 may pass through the light-adjusting unit 300, and the light-adjusting unit 300 may deflect all the emitted light from the optical film 20 to make it to be deflected to the small viewing angle area A+ area, and the light emitted by the backlight module 1000 may be more uniform.

The orthographic projection areas of the light-adjusting units 300 on the light-exiting surface k1 of the backlight module may all be equal. On the one hand, the shapes of the light-adjusting units 300 may be the same, which may be convenient for manufacture. For example, because the second surface 3200 of the light-adjusting unit 300 may have an included surface, it may be easier to realize that the inclined surface has the same inclination angle and the same inclination area. On the other hand, the orthographic projection areas of the light-adjusting units 300 on the light-exiting surface k1 of the backlight module may all be equal, the light emitted from different positions of the optical film 20 may be deflected by the light-adjusting units 300 with the same structure, and the deflection angles of the light may be same. Accordingly, the light emitted by the backlight module 1000 may be more uniform.

In some embodiments, referring to FIG. 6 and FIG. 13, a plurality of light adjusting units 300 may be arranged along the second direction F2 to form light-adjusting unit rows, and a plurality of light-adjusting units 300 may be arranged along the third direction F3 to form light-adjusting unit columns. The second direction F2 may be parallel to the row direction X, and the third direction F3 may be parallel to the column direction Y.

In one embodiment, the second direction F2 may be parallel to the row direction X, and the third direction F3 may be parallel to the column direction Y. For example, the light adjustment units 300 may be arranged along the row direction X to form light adjustment unit row, and the light adjustment units 300 may be arranged along the direction Y to form the light adjustment unit column. In the row direction X and the column direction Y, the light emitted from the optical film 20 may be deflected at the same time to increase the luminous flux in the small viewing angle area after the deflection. The contour light with the contrast of 1300 may be expanded in the left, right and up and down directions such that the contrast of the small viewing angle area A+ area may be completely covered within the contour line with a contrast ratio of 1300. Accordingly, the contrast of the small viewing angle area A+ area may meet the requirements.

Figure 17:
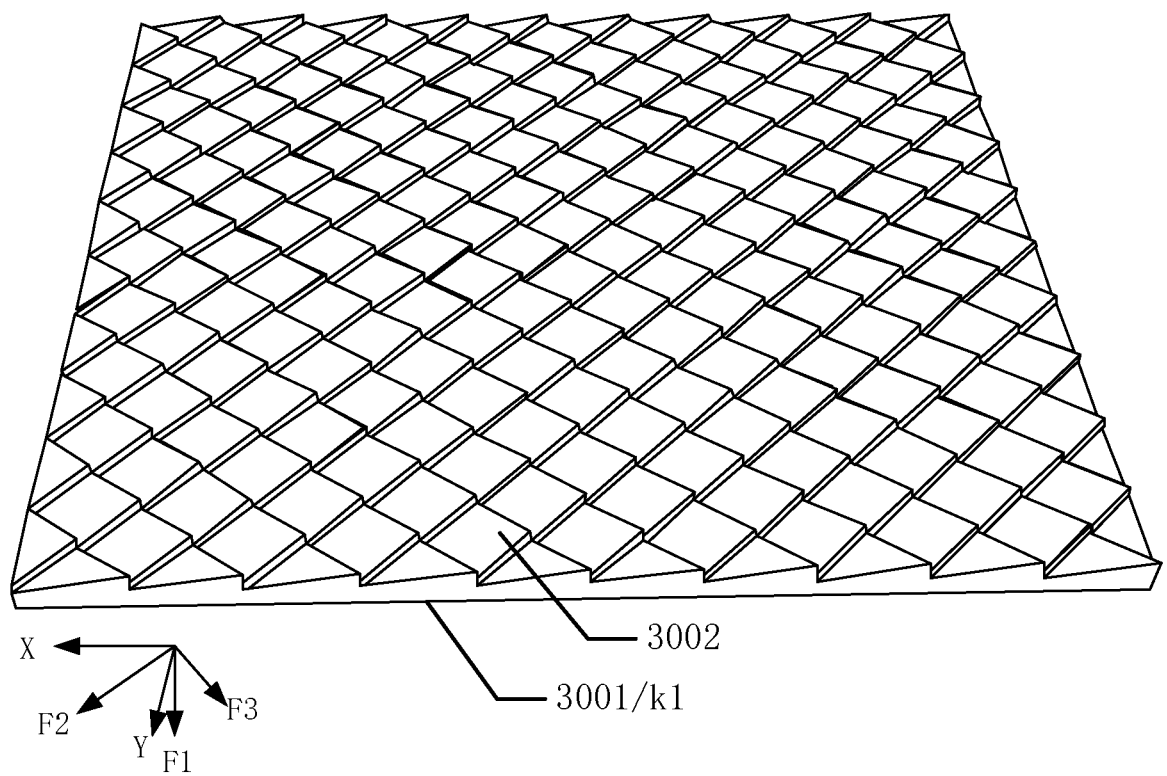
FIG. 17 illustrates another exemplary light-adjusting layer according to various disclosed embodiments of the present disclosure.
Figure 18:
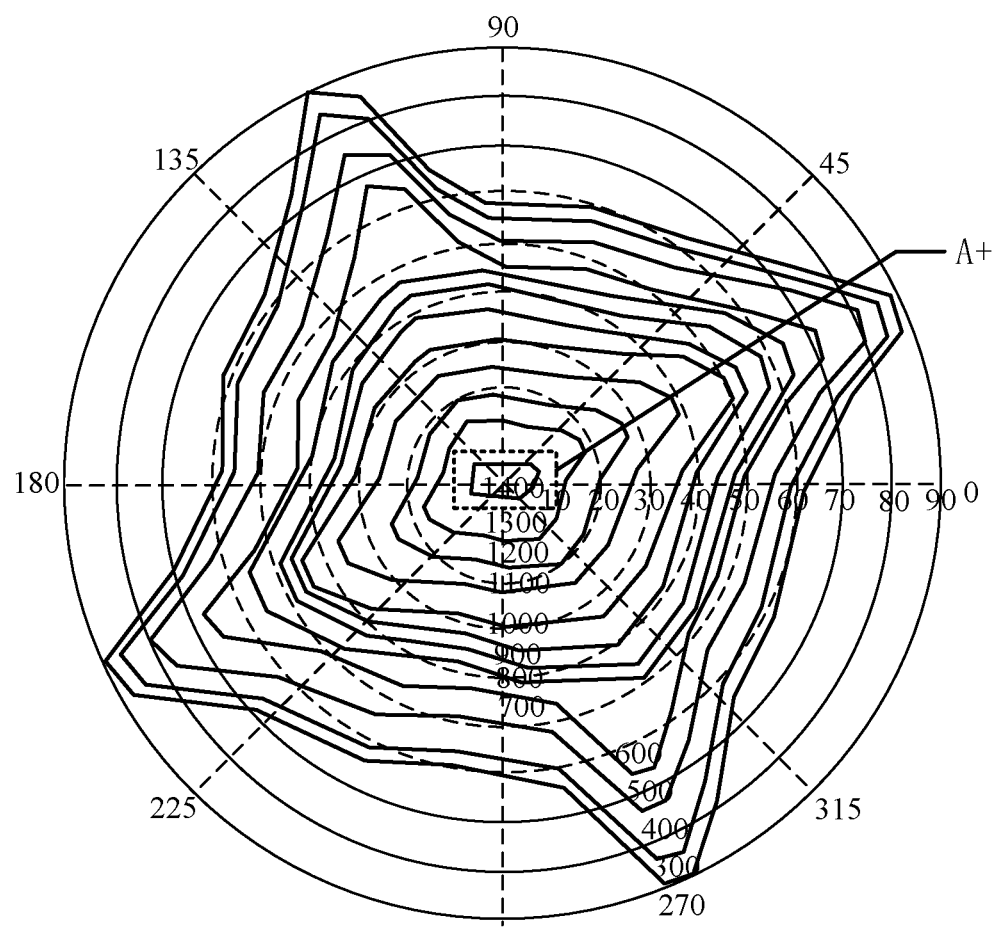
FIG. 18 illustrates an exemplary contour plot of contrast of a backlight module after using the light-adjusting layer in FIG. 17.

FIG. 17 illustrates another exemplary light-adjusting layer according to various disclosed embodiments of the present disclosure; and the viewing angle is an upward viewing angle. FIG. 18 is a schematic diagram of the contrast contour line of the backlight module after using the light-adjusting layer in FIG. 17. In some embodiments, referring to FIG. 17 and FIG. 18, and referring to FIG. 7, FIG. 8, FIG. 14 and FIG. 15, a plurality of light-adjusting units 300 may be arranged along the second direction F2 to form light-adjusting unit rows, and a plurality of light-adjusting units 300 may be arranged along the third direction F3 to form light-adjusting columns. The angle between the second direction F2 and the row direction X may be approximately 40°, and the angle between the second direction F2 and the column direction Y may be approximately 50°.

In one embodiment, the light-adjusting units 300 may be not arranged along the row direction X but form an angle of 40° with the row direction X. At the same time, the light-adjusting units 300 may be not arranged along the column direction Y but with an angle of 50° with the column direction Y. For the structure of the second surface 3002 in the light-adjusting unit 300, reference may be made to the structures of FIG. 7, FIG. 8, or FIG. 14 and FIG. 15, which will not be repeated here.

Referring to FIG. 18, in one embodiment, along the second direction F2, the light-adjusting unit 300 may have a surface inclining to the side away from the light-exiting surface k1 of the backlight module, and at the same time, along the third direction F3, the light-adjusting unit 300 may also have a surface inclining to the side away from the light-exiting surface k1 of the backlight module. Thus, the light-adjusting unit 300 may deflect light in the second direction F2 and the third direction F3 at the same time such that the light may be increased in both the second direction F2 and the third direction F3. Accordingly, the contrast may be increased after the luminous flux in the second direction F2 and the third direction F3 is increased. At the same time, the plurality of light-adjusting units 300 may be arranged along the second direction F2 to form light-adjusting unit rows, and the angle between the second direction F2 and the row direction X may be approximately 40°. Further, the plurality of light-adjusting units 300 may be arranged along the third direction F3 to form light-adjusting unit columns, and the angle between the second direction F2 and the column direction Y may be approximately 50°. Such a configuration may be equivalent to rotating the contrast contour at a certain angle on the basis of the increase of the contrast after the increase of the luminous flux in the second direction F2 and the third direction F3. The contrast of the small viewing angle area A+ area after the rotation may be completely covered within the contour line with a contrast of 1300. Accordingly, the contrast of the small viewing angle area A+ area of may meet the requirements.

Figure 19:
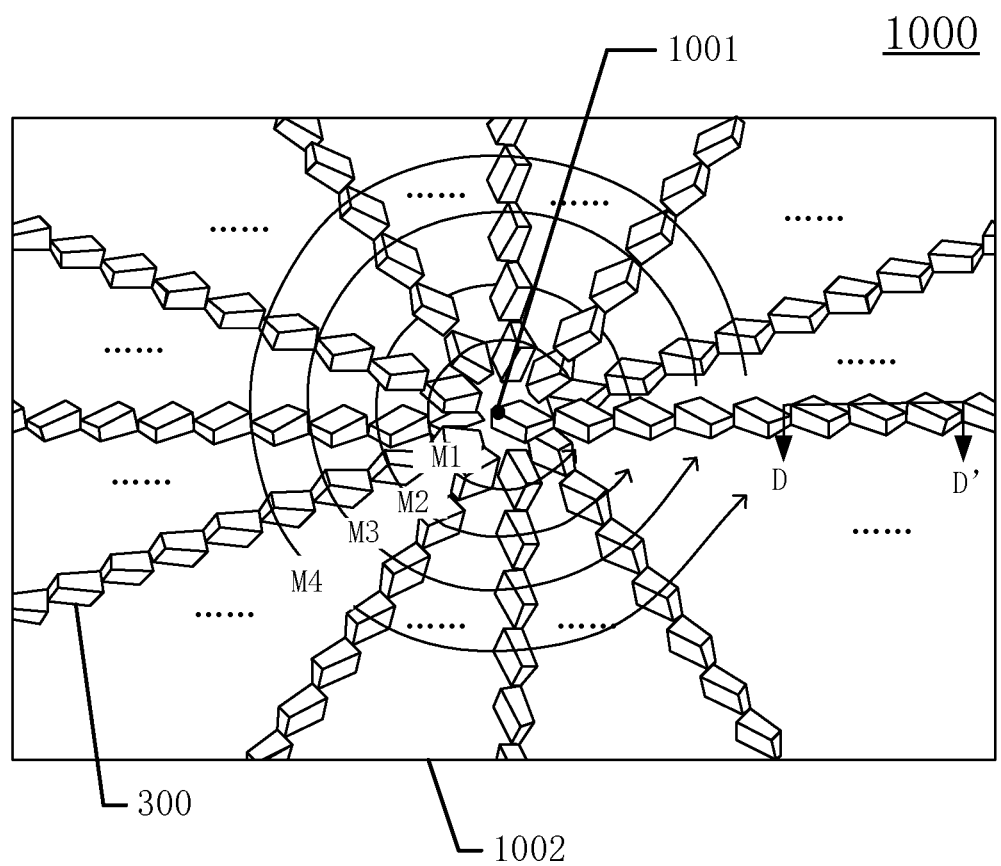
FIG. 19 illustrates another exemplary backlight module according to various disclosed embodiments of the present disclosure.
Figure 20:
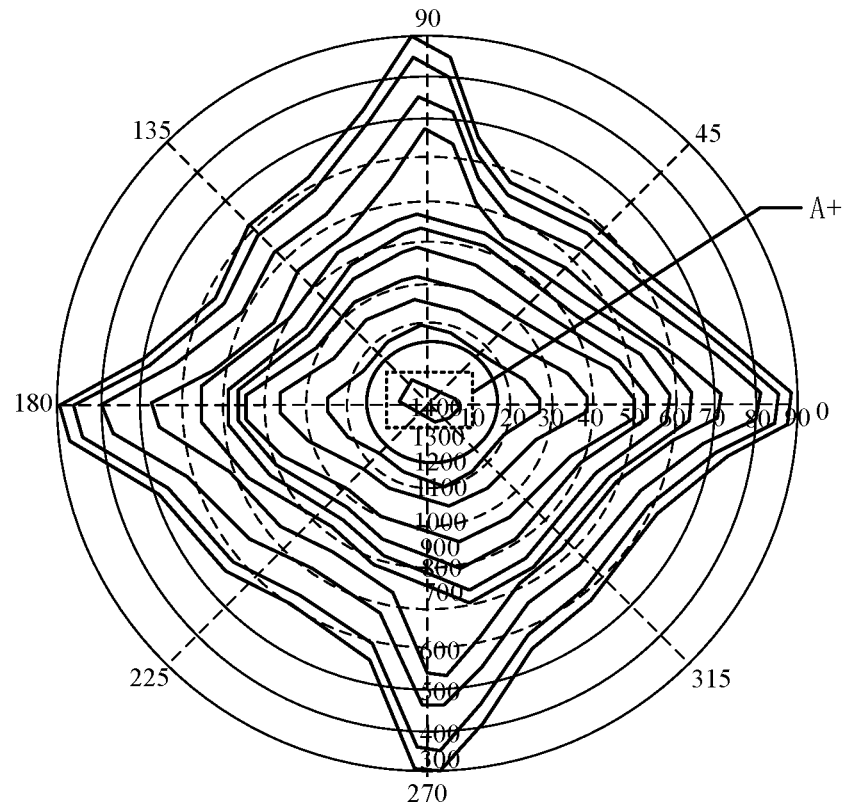

FIG. 19 is a schematic plan view of another exemplary backlight module provided by the present disclosure, and FIG. 19 does not show structures, such as the optical film 20, but only shows the structure of the light-adjusting layer 30. FIG. 20 is a schematic diagram of the contrast contour of the backlight module in FIG. 19. As shown in FIGS. 19-20, the backlight module 100 may include a center point 10001 and a boundary 10002. In a direction from the center point 10001 to the boundary 10002, a plurality of light-adjusting units 300 may be arranged in concentric circles.

In FIG. 19, pattern filling is not performed on the backlight module 1000. The light-adjusting units 300 may be arranged in concentric circles in the direction from the center point 10001 to the boundary 10002 using the center point 10001 as the center. The number of light-adjusting units 300 in FIG. 19 is only for schematic illustration; and it does not serve as a limitation on the number of light-adjusting units 300 in actual products. The graphic of the boundary 10002 of the backlight module 1000 is not specifically limited here. In FIG. 19, the configuration that the boundary 10002 of the backlight module 1000 is a rectangle is used as an example, and the boundary 10002 may also be a circle or other shapes.

In one embodiment, the plurality of light-adjusting units 300 are arranged in concentric circles, which may be equivalent to deflecting the light emitted from the optical film 20 in the circumferential direction. The contrast contour after the deflection may be close to a circle, and the light-adjusting unit 300 may include the first surface 3002a and the second sub-surface 3002b. Thus, in the direction from the center point 10001 to the boundary 10002 and in the direction intersecting with the direction from the center point 10001 to the boundary 10002, the light emitted from the optical film 20 may be deflected. Accordingly, the contour line with the contrast of 1300 may be stretched in the left and right directions and the up and down directions, and the contrast contour line after deflection may be close to a circle, and the contrast of the small viewing angle area A+ area may be completely covered by the contour line with a contrast of 1300. Thus, the contrast of the small viewing angle area A+ area may meet the requirements.

Figure 21:
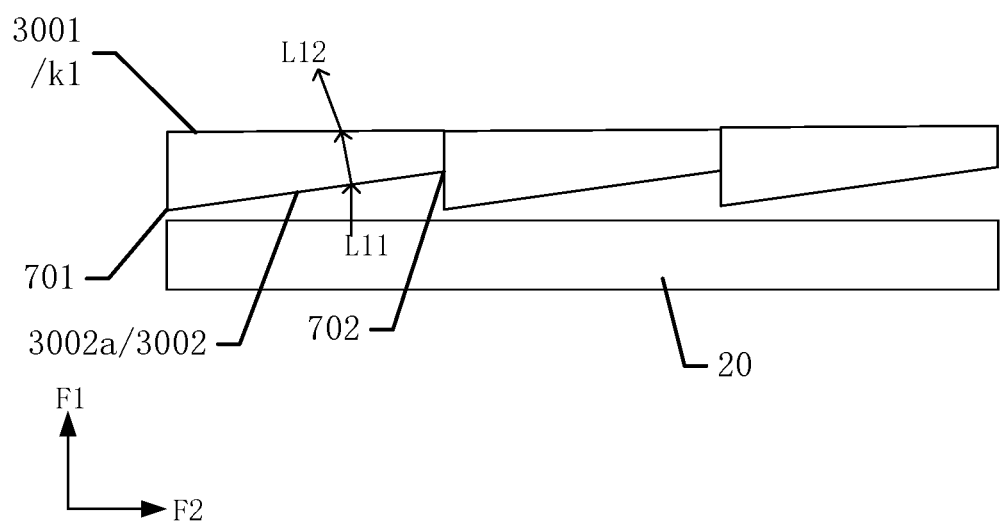
FIG. 21 illustrates an exemplary D-D'-sectional view in FIG. 19.

FIG. 21 illustrates a D-D'-sectional view in FIG. 19. As shown in FIG. 21, in the light-adjusting unit 300 provided by the present disclosure, the first sub-surface 3002a may include a first end 701 and a second end 702. The first end 701 may be located on the side of the second end 702 adjacent to the center point 10001. The distance between the first end 701 and the optical film 20 may be smaller than the distance between the second end 702 and the optical film 20.

In FIG. 21, pattern filling is not performed on the light-adjusting unit 300 and the optical film 20. Referring to FIG. 19, it can be seen that, along the first direction F1, the distance between the side of the light-adjusting unit 300 adjacent to the center point 10001 and the optical film 20 may be relatively short, while the distance between the side far from the center point 10001 and the optical film 20 may be relatively long. According to the light path in FIG. 21, the light emitted from the optical film 20 may pass through the first sub-surface 3002a and may be deflected to the side of the center point 10001 as a whole. The angle between the first sub-surface 3002a and the light-exiting surface k1 of the backlight module may be adjusted to control the deflection direction in approximately 10°. For example, the luminous flux of the small viewing angle area A+ area may be increased, and the large-angle luminous flux may be reduced. The contrast of the small viewing angle area A+ area may be completely covered within the contrast contour line of 1300, and the contrast of the small viewing angle area A+ area may meet the requirements.

In some embodiments, referring to FIG. 19, the orthographic projection area of the light-adjusting unit 300 adjacent to the center point 10001 on the light-exiting surface k1 of the backlight module may be smaller than the orthographic projection area of the light-adjusting unit 300 far away from the center point 10001 on the light-existing surface k1 of the backlight module.

FIG. 19 schematically shows concentric circles M1, M2, M3, and M4. The number of concentric circles is not specifically limited. In the direction from the center point 10001 to the boundary 10002, the radius of the concentric circles may gradually increase. The radius of concentric circle M1 may be smaller than the radius of the concentric circle M2, the radius of the concentric circle M2 may be smaller than the radius of the concentric circle M3, and the radius of the concentric circle M3 may be smaller than the radius of the concentric circle M4. The tighter the arrangement of the light-adjusting units 300 is, the more uniform the light deflection effect on the optical film 20 is. To cause the light-adjusting units 300 to have a dense arrangement without intervals, the orthographic projection area of the light-adjusting unit 300 adjacent to the center point 10001 on the light-exiting surface k1 may be smaller than the orthographic projection area of the light-adjusting unit 300 away from the central point 10001 on the light-exiting surface k1 of the backlight module, and there may be no interval between adjacent light-adjusting units 300. In such a configuration, all the light emitted from the optical film 30 may pass through the light-adjusting units 300, and the light-adjusting units 300 may deflect all the light emitted from the optical film 20 to the small viewing angle area A+ area, and the light emitted from the backlight module 1000 may be more uniform. If there is an interval between the light-adjusting units 300, there must be light from the optical film 20 directly emitted from the interval between the light-adjusting units 300, and this part of the light may not be deflected but continue along the first direction F1. In this way, only the light at the corresponding position of the light-adjusting unit 300 may be deflected into the small viewing angle area A+ area, resulting in uneven light emitted from the backlight module.

Figure 22:
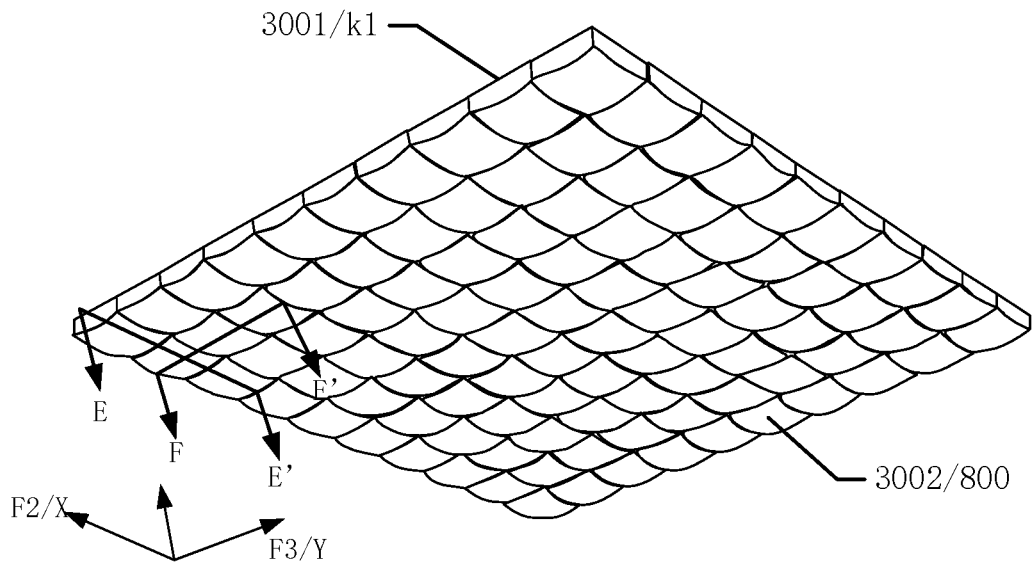
FIG. 22 illustrates another exemplary light-adjusting layer according to various disclosed embodiments of the present disclosure.
Figure 23:
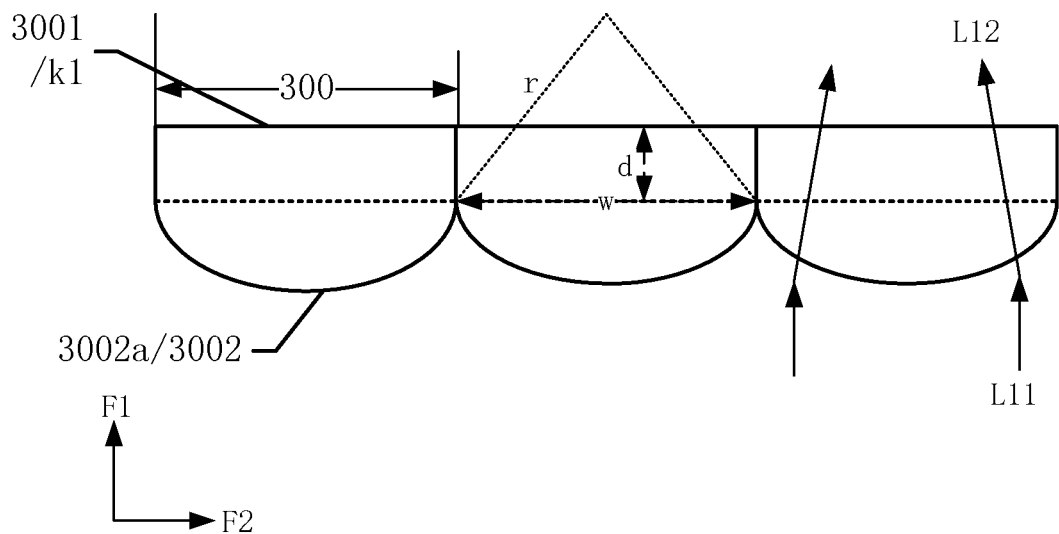
FIG. 23 illustrates an exemplary E-E'-sectional view in FIG. 22.
Figure 24:
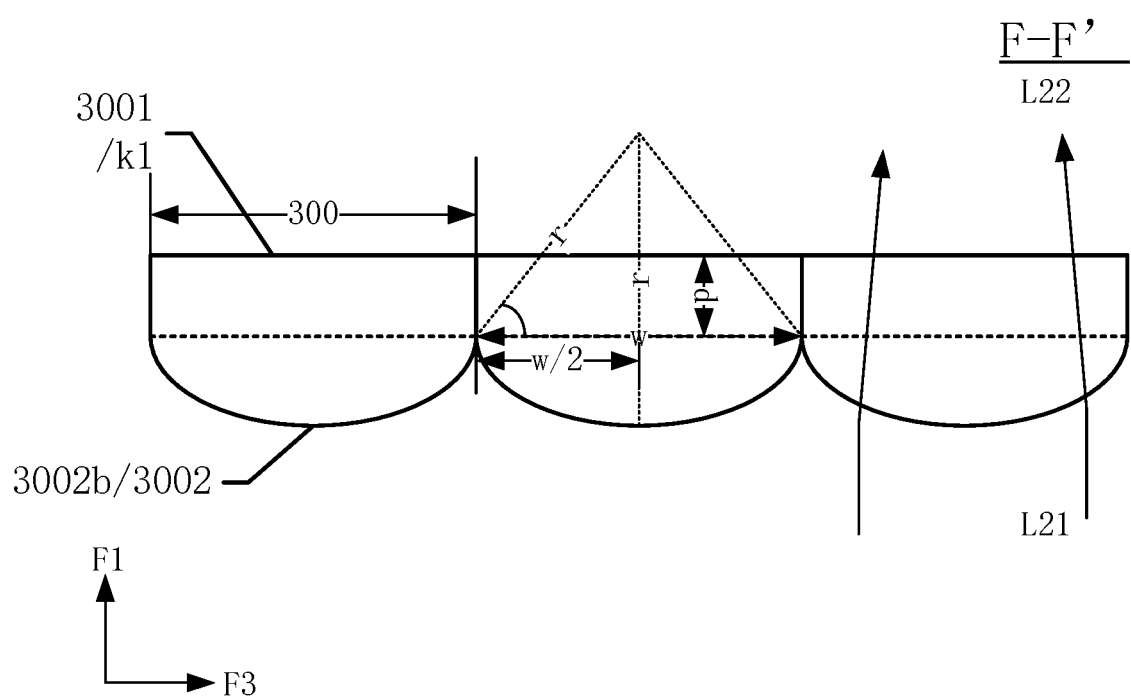
FIG. 24 illustrates an exemplary F-F'-sectional view in FIG. 22.
Figure 25:
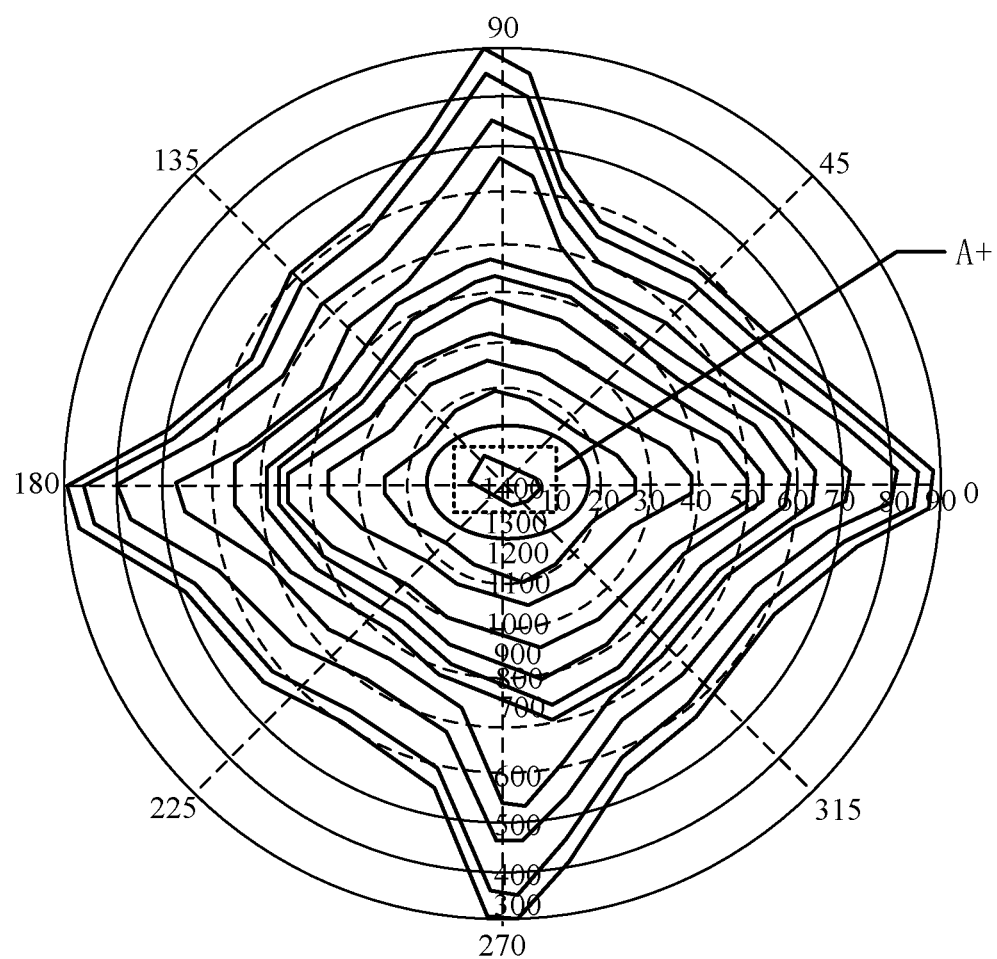
FIG. 25 illustrates an exemplary contour plot of contrast of a backlight module after using the light-adjusting layer in FIG. 22.

FIG. 22 is a schematic structural diagram of another exemplary light-adjusting layer provided by the present disclosure. FIG. 23 illustrates an E-E'-sectional view in FIG. 22. FIG. 24 is an F-F'-sectional view in FIG. 22. FIG. 25 is a schematic diagram of the contrast contour of the backlight module after using the light-adjusting layer in FIG. 22. As shown in FIGS. 23-25, in some embodiments, both the first sub-surface 3002a and the second sub-surface 3002b may be arc surfaces.

FIG. 22 only schematically shows the situation that adjacent light-adjusting units 300 are closely arranged. Referring to FIGS. 22-24, along the second direction F2, the first sub-surface 3002a may protrude to the side away from the light-exiting surface k1 of the backlight module and the first sub-surface 3002a may be an arc surface. The plane where the first sub-surface 3002a is located may intersect the plane where the first surface 3001 is located. The first direction F1 may intersect the second direction F2, and the second direction F2 may be parallel to the light-exiting surface k1 of the backlight module. As shown in FIG. 22, the light L11 enters the light-adjusting unit 200, because the first sub-surface 3002a may be an arc surface, and the refractive index of the light-adjusting unit 300 may be greater than that of air, after the light L11 passes through the first sub-surface 3002a, the emitted light may be L12. The light L12 may be deflected to a smaller angle and may have a certain angle with the first direction F1.

Along the third direction F3, the second sub-surface 3002b may protrude toward the side away from the light-exiting surface k1 of the backlight module, and the second sub-surface 3002b may be an arc surface, and the plane where the second sub-surface 3002b is located may intersect the plane where the first surface 3001 is located. The first direction F1 may intersect with the third direction F3, and the third direction F3 may be parallel to the light-exiting surface k1 of the backlight module. As shown in FIG. 24, the light L21 may enter the light-adjusting unit 300, because the second sub-surface 3002 may be an arc surface protruding toward the side away from the light-exiting surface k1 of the backlight module, and the refractive index of the light-adjusting unit 300 being greater than that of air, the light L21 may pass through the first sub-surface 3002a and emit light as L22. The light L22 may be deflected in the direction of a small angle, and may have a certain angle with the first direction F1.

Referring to FIG. 23 and FIG. 24, the first sub-surface 3002a and the second sub-surface 3002b may be two sub-surfaces intersecting in the second direction F2 and the third direction F3. It can be understood that, along the second direction F2, the light-adjusting unit 300 may have a curved surface that protrudes toward the side away from the light-exiting surface k1 of the backlight module, and at the same time, along the third direction F3, the light-adjusting unit 300 may also has a curved surface that protrudes toward the side away from the light-exiting surface k1 of the backlight module. Thus, the first sub-surface 3002a and the second sub-surface 3002b may deflect the light in the second direction F2 and the third direction F3 at the same time such that the light in the second direction F2 and the third direction F3 may be both increased, and the luminous contrast of the backlight module may be increased after the luminous flux in the second direction F2 and the third direction F3 is increased.

It can be seen from the contrast contour diagram in FIG. 25 that the backlight module 1000 of the present disclosure may be provided with the light-adjusting layer 30. The first sub-surface 3002a and the second sub-surface 3002b in the light-adjusting unit 300 of the light-adjusting layer 30 may both be curved surface. The contour line with a contrast ratio of 1300 may be expanded in the left, right and up and down directions; and the contrast of the small viewing angle area A+ area may be completely covered within the contour line with a contrast ratio of 1300. Accordingly, the contrast of the small viewing angle area A+ area may meet the requirements.

In some embodiments, referring to FIG. 22 to FIG. 25, the second surface 3002 of the light-adjusting unit 300 may include a microlens 800 protruding away from the light-exiting surface k1 of the backlight module.

As an important optical element, the microlens 800 may have the characteristics of small size, light weight, and high integration. The microlens 800 may have a converging or diverging effect. The second surface 3002 of the light-adjusting unit 300 in the present disclosure may constitute the microlens 800 protruding away from the side of the light-exiting surface k1 of the backlight module. Thus, the microlens 800 may have a divergent effect, and the direction of divergence may be along the circumferential direction. Accordingly, the microlens 800 may deflect light in the circumferential direction at the same time, and the light in the circumferential direction may be increased, and the contrast may be increased after the luminous flux in the circumferential direction is increased. It can be seen from the contrast contour diagram in FIG. 25 that the backlight module 1000 of the present disclosure may be provided with the light-adjusting layer 30, and the second surface 3002 of the light-adjusting unit 300 may form the microlens 800 protruding toward the side away from the light-exiting surface k1 of the backlight module. The contour line with a contrast ratio of 1300 may be enlarged in the circumferential direction. Thus, the contrast of the small viewing angle area A+ area may be completely covered within the contour line with a contrast ratio of 1300; and the contrast of the small viewing angle area A+ area may meet the requirements.

In some embodiments, referring to FIG. 22, FIG. 23 and FIG. 24, the projected area of the microlens 800 on the plane where the second direction F2 is located may be equal to the projected area of the microlens on the plane where the third direction F3 is located.

FIG. 23 may be considered as an orthographic projection of the microlens 800 on the plane where the second direction F2 is located, and FIG. 24 may be considered as an orthographic projection of the microlens 800 on the plane where the third direction F3 is located. In one embodiment, the microlens 800 may be a hemisphere protruding away from the light-exiting surface k1 of the backlight module. The projected area of the microlens 800 on the plane where the second direction F2 is located may be equal to the projected area on the plane where the third direction F3 is located. On the one hand, it may be convenient to manufacture the microlens 800. On the other hand, the projected area of the microlens 800 on the plane where the second direction F2 is located may be equal to the projected area on the plane where the third direction F3 is located, after the light passes through the microlens 800, the adjusted deflection angles from the second direction F2 and the third direction F3 may be substantially same. Thus, the light emitted by the backlight module 1000 may be more uniform.

It should be noted that if the microlens 800 is set to protrude toward the side of the light-exiting surface k1 of the backlight module, the light emitted from the light-adjusting layer 30 may be focused before reaching the cover plate of the display device, resulting in regular bright spots appearing in the small viewing angle A+ area of, which may be similar to firefly dots. The microlens 800 of the present disclosure may protrude toward the side away from the light-exiting surface k1 of the backlight module, and the light emitted from the light-adjusting layer 30 may not be focused before reaching the panel, which may not cause regular bright spots in the small viewing angle area A+ area.

In some embodiments, referring to FIG. 22, FIG. 23 and FIG. 24, the projection of the microlens 800 on the plane where the second direction F2 is located and the projection of the microlens 800 on the plane where the third direction F3 is located may both be circular segments, and the radius of the circular segment may be r, the width of the bow may be w, and w/2r=cos 71°.

It can be understood that FIG. 23 shows the projection of the microlens 800 on the plane where the second direction F2 is located, and the projection is a circular segment. In one embodiment, when designing the microlens 800, it may be designed through a simulation experiment, and the parameters may be set. For example, air refractive index n1=1, and the refractive index of the microlens 800 is n2-1.49. The radii of the microlens 800 in the second direction F2 and the third direction F3 may be equal. The width w and the radius r of the microlens 800 may be designed, and the light-emitting angle of the backlight module 1000 under the current setting may be simulated. By adjusting the above parameters, the light-emitting angle of the backlight module 1000 may be updated and confirmed. Through multiple rounds of iterations, when w/2r-cos 71°, the simulated light-emitting angle may reach the small viewing angle area A with a value about 10°. Along the direction perpendicular to the plane where the light-exiting surface k1 of the backlight module is located, the thickness of the microlens 800 may be $d=r(1-\sin 71°)$.

In some embodiments, referring to FIGS. 6.-FIG. 8, the refractive index of the light-adjusting layer 30 may be in a range of approximately 1.49-1.51.

The small viewing angle area A+ area referred to in the present disclosure may refer to the area having an angle of 10° with the first direction F1. For example, the angle between the light emitted from the optical film 20 and the first direction F1 after passing through the light-adjusting layer 30 may be approximately about 10°. According to the refractive index formula $n1 \sin \alpha1 = n2 \sin \alpha2$, the light enters the light-adjusting layer 30 from the air and may undergo one refraction, and then exits from the light-adjusting layer 30 and enters the upper layer air (the part of the light-adjusting layer 30 adjacent to the light-exiting surface k1 of the backlight module), and may be refracted again. Thus, if the light needs to be deflected to approximately 10° (that is, the angle between the light and the first direction F1 after entering the upper air from the light-adjusting layer 30 is about 10°), the refractive index of the light-adjusting layer 30 may need to be greater than the refractive index of air. The refractive index n1 of air may be 1.00029, and the material of the light-adjusting layer 30 may include polymethyl methacrylate. After simulation experiments, the refractive index n2 may be in a range of approximately 1.49-1.51, which may ensure the angel between the light emitted from the optical film 20 and passing through the light-adjusting layer 30 and the first direction F1 is approximately 10°.

In some embodiments, referring to FIG. 4 and FIG. 5, the optical film 20 may include a light guide plate 3 and a lower diffuser 40 located on the side of the light guide plate 3 adjacent to the light-adjusting layer 30. The light-emitting unit 10 may be located on at least one side of the light guide plate 3.

The backlight module 1000 may be a side-entry type backlight module. The optical film 20 may include a light guide plate 3, and the light guide plate 3 may be opposite to the light-emitting unit 10 in the column direction Y. The optical film 20 may also include the lower diffuser 40 located on the side of the light guide plate 3 adjacent to the light-exiting surface k1 of the backlight module. The function of the lower diffuser 40 may be to uniformize the light emitted from the lower side. The light-emitting unit 10 may be located on at least one side of the light guide plate 3. FIG. 4 only illustrates the configuration that the light-emitting unit 10 is disposed on one side of the light guide plate 3. In some embodiment, along the column direction Y, the light-emitting unit may be disposed on both sides of the light guide plate, which is not shown here.

In the backlight module 1000 of the present disclosure, by disposing the light-adjusting unit 300 on the side of the lower diffuser 40 away from the light guide plate 3, the light-adjusting unit 300 may simultaneously deflect the light in the second direction F2 and the third direction F3, and the light in the second direction F2 and the third direction F3 may both be increased, and the contrast may be increased after the luminous flux in the second direction F2 and the third direction F3 are increased. Thus, after deflection, the luminous flux in the small viewing angle area may be increased, and the contour line with a contrast ratio of 1300 may be expanded in the left, right and up and down directions. Accordingly, the contrast of the small viewing angle area A+ area may be completely covered within the contour line with a contrast ratio of 1300, making the contrast of the small viewing angle area A+ area meet the requirements.

Figure 26:
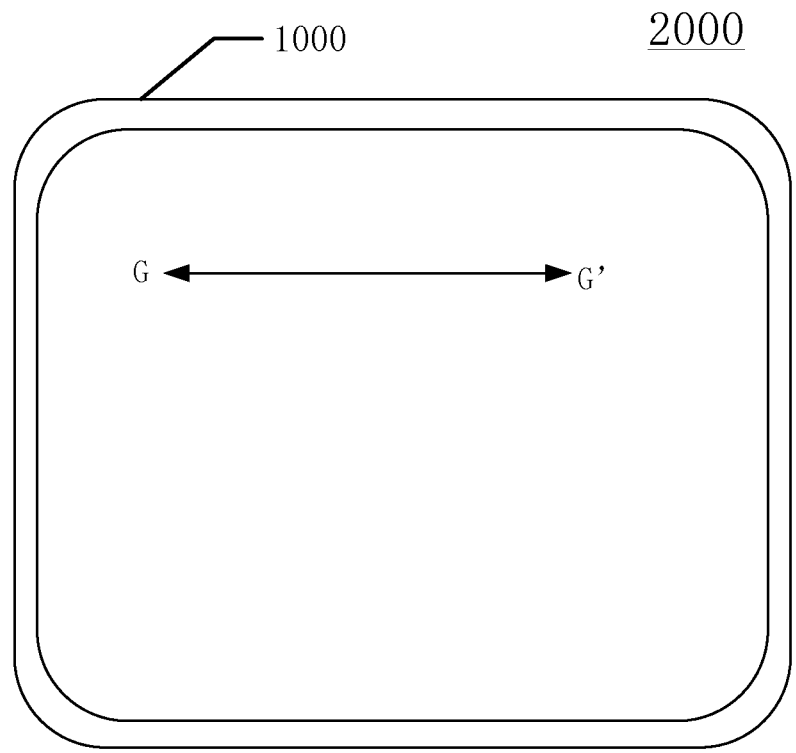
FIG. 26 illustrates an exemplary display device according to various disclosed embodiments of the present disclosure.
Figure 27:
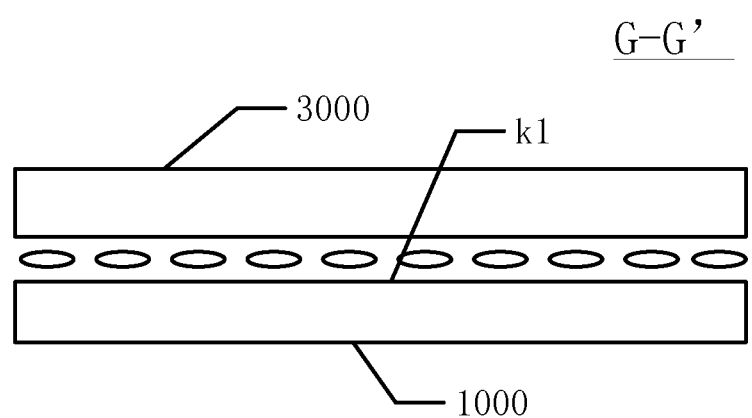
FIG. 27 illustrates an exemplary G-G'-sectional view in FIG. 26.

The present disclosure also provides a display device. FIG. 26 is a schematic plane view of an exemplary display device provided by the present disclosure. FIG. 27 is a G-G'-sectional view in FIG. 27. As shown in FIGS. 26-27, the display device of the present disclosure may include a backlight module 1000 of any of the above-mentioned embodiments, and a display panel 3000 located on the light-exiting surface side of the backlight module 1000. The display device may also include liquid crystal molecules located between the display panel 2000 and the backlight module 1000. The display panel 2000 and the backlight module 1000 are not pattern-filled in the figure.

FIG. 26 only takes the vehicle-mounted display device as an example to illustrate the display device 2000, it can be understood that the display device 2000 provided by the embodiment of the present disclosure may be a computer, a TV, a mobile phone and other display devices with a display function, and the present disclosure is not specifically limited thereto. The display device 2000 provided by the embodiment of the present disclosure may have the beneficial effects of the backlight module 1000 provided by the embodiments of the present disclosure. For details, reference may be made to the specific descriptions of the backlight module 1000 in the above embodiments, and details will not be repeated here in this embodiment.

It can be seen from the above embodiments that the backlight module and display device provided by the present disclosure may at least achieve the following beneficial effects.

In the backlight module of the present disclosure, the light emitted by the light-emitting unit may pass through the optical film and propagate along the direction perpendicular to the light-exiting surface of the backlight module, and then may be deflected by the light-adjusting layer. On the side of the light-exiting surface, the light-adjusting layer may deflect the light perpendicular to the direction of the light-exiting surface of the backlight module to a direction with a small angle. On the one hand, the prism may be replaced by the light-adjusting layer. The prism needed to be set as two layers of prism strips, one layer of prism strips extend along the second direction and arranged along a third direction, and the other layer of prism strips extends along the third directions, and arranged along the second direction, and the manufacturing process is relatively complicated. The present disclosure may only use one layer of light-adjusting layer to replace the prism, and the manufacturing process may be simplified.

Further, if the angle of deflection is too large, there will be more light at a large viewing angle, but less light at a small viewing angle, so that the contrast of the small viewing angle area cannot meet the requirements. The light-adjusting layer in the present disclosure may include a plurality of light-adjusting units. A light-adjusting unit may include a first surface and a second surface oppositely arranged along the first direction. The first surface is located on the side of the second surface adjacent to the light-exiting surface of the backlight module. The second surface may at least include a first sub-surface and a second sub-surface. The first surface may be a flat surface. Along the second direction, the plane where the first sub-surface is located may intersect the plane where the first surface is located. The first sub-surface may be inclined to the side away from the light-exiting surface of the backlight module. Along the third direction, the plane where the second sub-surface is located may intersect the plane where the first surface is located, and the second sub-surface may be inclined to the side away from the light-exiting surface of the backlight module. The first direction, the second direction and the third direction may all intersect each other, and the second direction and the third direction may be parallel to the light-exiting surface of the backlight module. The light may be deflected in the second direction and the third direction at the same time. Thus, the luminous flux in the small viewing angle area may be increased after the deflection, and the contrast in the small viewing angle area may meet the requirements of the backlight module.

Although some specific embodiments of the present disclosure have been described in detail through examples, those skilled in the art should understand that the above examples are for illustration only and not intended to limit the scope of the present disclosure. Those skilled in the art will appreciate that modifications may be made to the above embodiments without departing from the scope and spirit of the disclosure. The scope of the disclosure is defined by the appended claims.

What is claimed is:

1. A backlight module, comprising:
  a lighting-emitting unit;
  an optical film, wherein light provided by the light-emitting unit propagates in a first direction after passing through the optical film, and the first direction is a direction perpendicular to a light-exiting surface of the backlight module; and
  a light-adjusting layer located on a side of the optical film adjacent to the light-exiting surface of the backlight module,
  wherein the light-adjusting layer includes a plurality of light-adjusting units, a light-adjusting unit of the plurality of light-adjusting units includes a first surface and a second surface oppositely arranged along the first direction, the first surface is located on a side of the second surface adjacent to the light-exiting surface of the backlight module, the second surface at least includes a first sub-surface and a second sub-surface, the first surface is a flat surface, along a second direction, a plane where the first sub-surface is located intersects a plane where the first surface is located, the first sub-surface is inclined to a side away from the light-exiting surface of the backlight module, along a third direction, a plane where the second sub-surface is located intersects the plane where the first surface is located, and the second sub-surface is inclined to a side away from the light-exiting surface of the backlight module, the first direction, the second direction and the third direction all intersect each other, and the second direction and the third direction are parallel to the light-exiting surface of the backlight module.

2. The backlight module according to claim 1, wherein the light-adjusting unit comprises:
  a substrate and a microstructure bonded together,
  wherein the substrate includes the first surface, the microstructure includes the second surface and a third surface adjacent to a side of the second surface adjacent to the substrate, the third surface is a flat surface, a first vertical plane along the first direction passes through the first sub-surface and the third surface, an orthographic projection of the microstructure on a first cross-section is a right triangle, the first cross-section passes through the first sub-surface, the third surface and the first vertical plane, an angle formed by the third surface and the first vertical plane is a right angle, a second vertical plane along the first direction passes through the second sub-surface and the third surface, an orthographic projection of the microstructure on a second cross-section is a right triangle, the second cross-section passes through the second sub-surface, the third surface and the second vertical plane, and an angle formed by the third surface and the first vertical plane is a right angle.

3. The backlight module according to claim 2, wherein the light-adjusting unit comprises:
a substrate and a microstructure bonded together,
wherein the substrate includes the first surface, the microstructure includes the second surface and a third surface on a side of the second surface adjacent to the substrate, the third surface is a flat surface, a first vertical plane along the first direction passes through the first sub-surface and the third surface, an orthographic projection of the microstructure on a first cross-section is a right triangle, the first cross-section passes through the first sub-surface, the third surface and the first vertical plane, an angle formed by the third surface and the first vertical plane is a right angle, an orthographic projection of the microstructure on a second cross-section is an isosceles triangle, and the second cross-section passes through the second sub-surface and the third surface.

4. The backlight module according to claim 3, wherein:
an angle between the first sub-surface and the light-exiting surface of the backlight module is greater than or equal to approximately 2° and less than or equal to approximately 5°; and
an angle between the second sub-surface and the light-exiting surface of the backlight module is greater than or equal to approximately 2° and less than or equal to approximately 5°.

5. The backlight module according to claim 2, wherein:
orthographic projection areas of the plurality of light-adjusting units on the light-exiting surface of the backlight module are all equal, and there is no interval between adjacent light-adjusting units.

6. The backlight module according to claim 1, wherein:
a plurality of light-adjusting units are arranged along the second direction to form light-adjusting unit rows;
a plurality of light-adjusting units are arranged along the third direction to form light-adjusting unit columns;
the second direction is parallel to a row direction of the light-adjusting unit rows; and
the third direction is parallel to a column direction of the light-adjusting unit columns.

7. The backlight module according to claim 1, wherein:
a plurality of light-adjusting units are arranged along the second direction to form light-adjusting unit rows;
a plurality of light-adjusting units are arranged along the third direction to form light-adjusting unit columns;
an angle between the second direction and a row direction of the light-adjusting unit rows is approximately 40°; and
an angle between the second direction and a column direction of the light-adjusting unit columns is approximately 50°.

8. The backlight module according to claim 1, comprising:
a center point; and
a boundary,
wherein, in a direction from the center point to the boundary, the plurality of the light-adjusting units are arranged in concentric circles.

9. The backlight module according to claim 8, wherein:
the first sub-surface includes a first end and a second end;
the first end is located on a side of the second end adjacent to the center point; and
a distance between the first end and the optical film is smaller than a distance between the second end and the optical film.

10. The backlight module according to claim 8, wherein:
an orthographic projection area of a light-adjusting unit of the plurality of light-adjusting units adjacent to the central point on the light-exiting surface of the backlight module is smaller than an orthographic projection area of a light-adjusting unit of the plurality of light-adjusting units far from the central point on the light-exiting surface of the backlight module.

11. The backlight module according to claim 1, wherein:
the first sub-surface and the second sub-surface are both arc surfaces.

12. The backlight module according to claim 11, wherein:
the second surface of the light-adjusting unit forms a microlens protruding away from the light-exiting surface of the backlight module.

13. The backlight module according to claim 12, wherein:
a projection area of the microlens on a plane where the second direction is located is equal to a projection area of the microlens on a plane where the third direction is located.

14. The backlight module panel according to claim 12, wherein:
a projection of the microlens on the plane where the second direction is located and a projection of the microlens on the plane where the third direction is located are both circular segments;
a radius of the circular segment is r;
a width of the circular segment is w; and $$w/2r = \cos 71°.$$

15. The backlight module according to claim 1, wherein:
a material of the light-adjusting layer includes polymethyl methacrylate.

16. The backlight module according to claim 1, wherein:
a refract index of the light-adjusting layer is in a range of approximately 1.49-1.51.

17. The backlight module according to claim 1, wherein the optical film comprises:
a light guide plate; and
a lower diffuser located on a side of the light guide plate adjacent to the light-adjusting layer,
wherein the light-emitting unit is located on at least one side of the light guide plate.

18. A display device, comprising:
a backlight module; and
a display panel disposed on a light-exiting side of the backlight module,
wherein the backlight module includes:
a lighting-emitting unit;
an optical film, wherein light provided by the light-emitting unit propagates in a first direction after passing through the optical film, and the first direction is a direction perpendicular to a light-exiting surface of the backlight module; and a light-adjusting layer located on a side of the optical film adjacent to the light-exiting surface of the backlight module, wherein the light-adjusting layer includes a plurality of light-adjusting units, a light-adjusting unit of the plurality of light-adjusting unit includes a first surface and a second surface oppositely arranged along the first direction, the first surface is located on a side of the second surface adjacent to the light-exiting surface of the backlight module, the second surface at least includes a first sub-surface and a second sub-surface, the first surface is a flat surface, along a second direction, a plane where the first sub-surface is located intersects a plane where the first surface is located, the first sub-surface is inclined to a side away from the light-exiting surface of the backlight module, along a third direction, a plane where the second sub-surface is located intersects the plane where the first surface is located, and the second sub-surface is inclined to a side away from the light-exiting surface of the backlight module, the first direction, the second direction and the third direction all intersect each other, and the second direction and the third direction are parallel to the light-exiting surface of the backlight module.

19. A backlight module, comprising:
a lighting-emitting unit; and
a light-adjusting layer, wherein:
  light emitted by the light-emitting unit passes through the light-adjusting layer, the light-adjusting layer includes a plurality of light-adjusting units, a light-adjusting unit of the plurality of light-adjusting units includes a first surface and a second surface oppositely arranged along a first direction, the first surface is a flat surface, and the flat surface is perpendicular to the first direction,
  a first cross-section and a second cross-section are obtained from the light-adjusting unit, wherein the first cross-section is located at a sectional plane formed by the first direction and a second direction, and the second cross-section is located at a sectional plane formed by the first direction and a third direction, the second direction intersects with the third direction, and both the second direction and the third direction parallel with the first surface, and
  the first sectional plane intersects with the first surface along a first line segment, the first sectional plane intersects with the second surface along a first line, the second sectional plane intersects with the first surface along a second line segment, and the second sectional plane intersects with the second surface along a second line, wherein an extension line of the first line segment intersects with an extension line of the first line, and an extension line of the second line segment intersects with an extension line of the second line.

20. The backlight module of claim 19, further comprising a lower diffuser, wherein:
  the light-adjusting unit is disposed on one side of the lower diffuser, and the light emitted by the light-emitting unit enters into the light-adjusting layer after passing through the lower diffuser, and
  the second surface of the light-adjusting unit is located on a side of the first surface of the light-adjusting unit close to the lower diffuser.

* * * * *